United States Patent
Pradhan et al.

(10) Patent No.: US 12,483,534 B2
(45) Date of Patent: Nov. 25, 2025

(54) ALTERNATE MEANS TO SHARING CONFIGURATION ACROSS MULTIPLE FIREWALLS OR GROUPS OF FIREWALLS

(71) Applicant: Palo Alto Networks, Inc., Santa Clara, CA (US)

(72) Inventors: Saurabh Pradhan, Dublin, CA (US); Miaomiao Shen, Los Gatos, CA (US); Michael Soren Jacobsen, Mountain View, CA (US); Srinath Gutti, Sunnyvale, CA (US); Sandeep Panuganti, Hayward, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 250 days.

(21) Appl. No.: 18/115,454

(22) Filed: Feb. 28, 2023

(65) Prior Publication Data

US 2024/0291801 A1  Aug. 29, 2024

(51) Int. Cl.
*H04L 29/06* (2006.01)
*H04L 9/40* (2022.01)

(52) U.S. Cl.
CPC .......... *H04L 63/0263* (2013.01); *H04L 63/20* (2013.01)

(58) Field of Classification Search
CPC ... H04L 63/0263; H04L 63/10; H04L 63/101; H04L 63/104; H04L 63/20; H04L 63/107
See application file for complete search history.

(56) References Cited

U.S. PATENT DOCUMENTS

| | | | |
|---|---|---|---|
| 8,707,270 B2* | 4/2014 | Whelan | G06F 40/154 717/136 |
| 9,992,064 B1* | 6/2018 | Chawla | H04L 41/082 |
| 11,516,254 B2* | 11/2022 | Singh | H04L 63/10 |
| 11,757,888 B2* | 9/2023 | Sreedhar | H04L 63/20 |

\* cited by examiner

*Primary Examiner* — Longbit Chai
(74) *Attorney, Agent, or Firm* — Van Pelt, Yi & James LLP

(57) ABSTRACT

The present application discloses a method, system, and computer system for providing policy configurations. The method includes (i) receiving a set of shared policy configurations, (ii) sharing the set of shared policy configurations across a plurality of entities, and (iii) deploying the set of shared policy configurations across the plurality of entities.

27 Claims, 15 Drawing Sheets

FIG. 5

Manage

- Configuration
  - Overview
  - Interfaces
  - Routing
  - Zones
  - Security Policy
  - Security Services
  - Network Services
  - Identity Services
  - Device Settings
  - Objects
- Operation

Config Tree | Snippets  »Unpin

Search
- ▼ Local (11)
  - ⊙ predefined-snippet ★
  - ⊙ snippet1 ★
  - ⊙ Mgd_Fw_Snippet ★
  - ⊙ PA_Snippet
  - ⊙ default
  - ⊙ optional-default
  - ⊙ office365
  - ⊙ proxy
  - ⊙ rbl
  - ⊙ saas-tenant-restrictions
  - ⊙ ZTP-Default-Snippet

[+ Add Snippet]

office365 | Overview

Welcome to Prisma Access Cloud Management.
If you're just starting out, follow these steps
running.

Variables (office365)

0
Variables office365

| | |
|---|---|
| Name | |
| Description | |
| Root in | |
| Created | |
| Last Updated | |
| Labels | |

---

Snippet Associations ✕  [🔍 Search] ← 510

Config trees (6)

| Name | |
|---|---|
| 514 → ▼ Global (Adelphi Test Account 5 - US - Prisma Access) ~ 512 | |
| ▶ Prisma Access | |
| ☐ Mobile Users | |
| ☐ Remote Networks | |
| ☐ Service Connections | |
| ▼ Firewalls | |
| ▼ Managed Firewalls | |
| ▼ East | |
| 🖳 East-Campus-NGFW | ☐ |
| 🖳 East-DC-NGFW | ☐ |
| ▼ West | |
| 🖳 West-DC | ☐ |

500

1300

ALTERNATE MEANS TO SHARING CONFIGURATION ACROSS MULTIPLE FIREWALLS OR GROUPS OF FIREWALLS

BACKGROUND OF THE INVENTION

Large scale deployments have large numbers of systems, devices, or other endpoints. The systems, devices, or endpoints may be arranged in a hierarchical structure. Because of the scale of such deployments, targeting the configuration of a specific multiple leaf nodes (e.g., systems, devices, or other endpoints in the hierarchy) is difficult to manage and maintain. Traditionally, administrators for the deployments individually configure the various leaf nodes. The administrators are tasked with ensuring that the various leaf nodes in the hierarchical structure are configured with the appropriate policy configurations, including updating the configurations in connection new or updated policy configurations.

BRIEF DESCRIPTION OF THE DRAWINGS

Various embodiments of the invention are disclosed in the following detailed description and the accompanying drawings.

FIG. 5 is an example of a user interface for associating snippets according to various embodiments.

DETAILED DESCRIPTION

Figure 1:
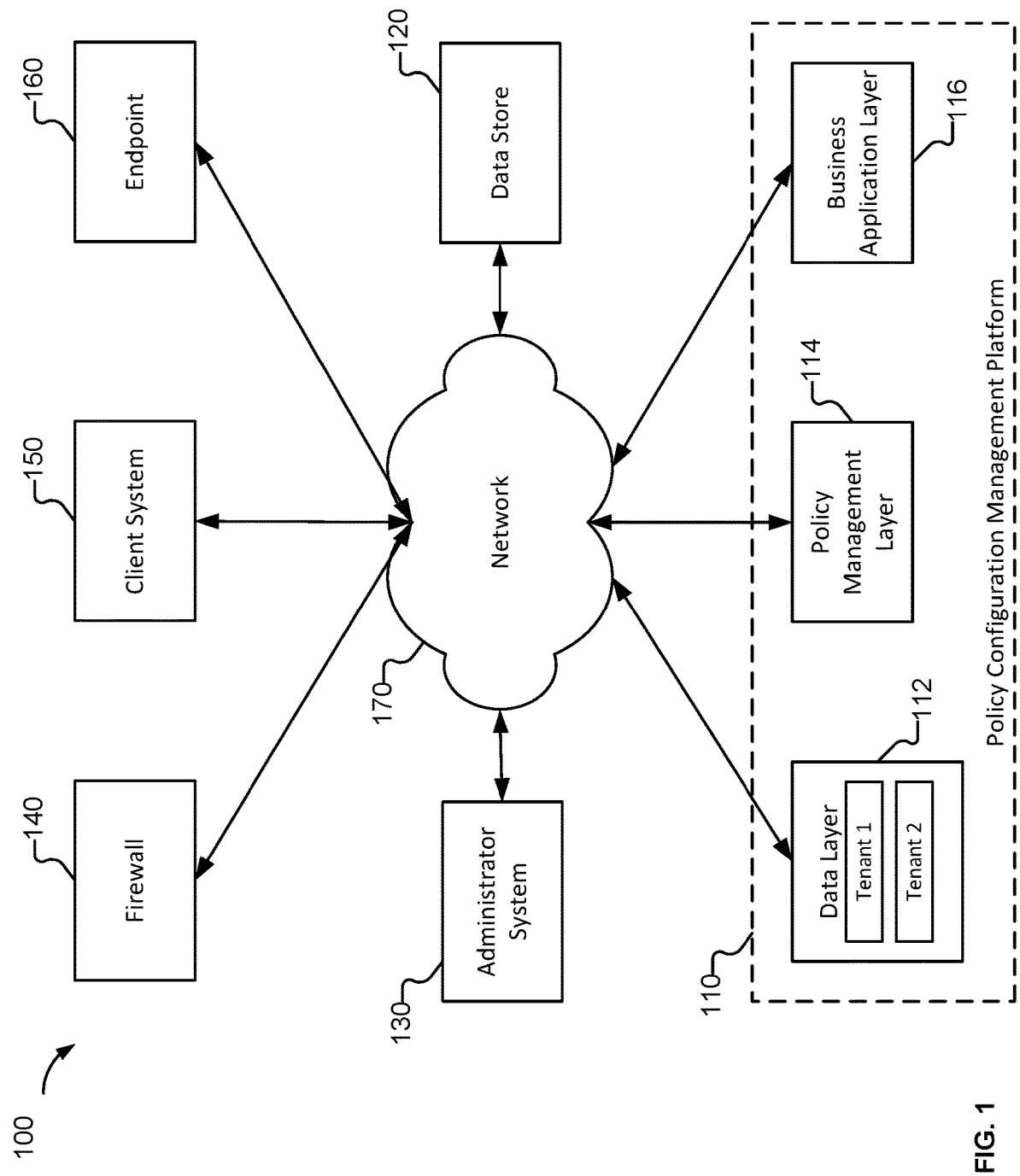
FIG. 1 is a block diagram of an environment for managing policy configurations according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a snippet may be a collection of one or more configurations for a system. For example, a snippet may include a collection of one or more network configurations. As another example, snippets include a collection of one or more security configurations. In some embodiments, a snippet is a means for a configuration to be defined outside of the construct of the containment hierarchy (e.g., device groups, folders, etc.).

As used herein, a tenant is a group of users or devices that share a common access with specific privileges to a software instance. For example, in the context of a cloud management platform, each customer of the cloud provider may have its own corresponding tenant. A customer may have a plurality of associated tenants, such as in the case that the customer has different environments in the solution provided by the cloud management platform. For example, the plurality of tenants associated with a particular customer may be respectively associated with the different environments, such as a development environment, a production environment, etc.

As used herein, an entity may comprise a device or system. Examples of entities include firewalls, a distributed computing environment (e.g., a cluster of virtual machines), a tenant, a customer or organization of a cloud management platform, mobile devices, client systems, or other endpoints. An entity may also be referred to herein as a containment object.

As used herein, an entity hierarchy or a containment hierarchy includes a hierarchical structure of entities. For example, an entity hierarchy may define an entity group(s) (e.g., device groups), folders, etc. Examples of an entity hierarchy may include a set of managed devices associated with a customer's environment/system, a set of one or more data centers or clusters of virtual machines implemented by one or more servers (e.g., a particular location of servers, etc.).

According to related art systems, if an administrator wants to apply a configuration to a containment object (e.g., device group, folder, etc.), the administrator creates/configures a hierarchy of containment objects (e.g., the containment hierarchy or also referred to herein as an entity hierarchy) and defines (e.g., writes) the configuration inside the containment object. In the case that the administrator wants to apply a same configuration across a plurality of containment objects within the containment hierarchy, the administrator individually creates/selects the containment objects and writes the configuration within such containment objects. As a result, the related art architecture restricts the ability to share configurations across containment objects, thereby causing inefficiency in the deployment of configurations (e.g., the administrator has to create the configuration definition many times) and an increase in the likelihood that the configuration will be improperly deployed (e.g., the administrator may introduce human error by erroneously improperly applying or defining a configuration, or by erroneously skipping a containment object for which a configuration should be applied).

Solution deployments generally have many different instances of the solution and related art systems require administrators to specifically configure the instances. For example, the cloud provider spins-up instances for a new customer, and each instance typically has the same baseline configurations, which requires the administrator to individually apply the configurations to the instances. However, at scale, the deployment may have thousands of tenants. As a result, deployment of configurations is burdensome and inefficient.

Various embodiments enable the sharing and deployment of a configuration(s) across a plurality of containment objects. For example, the system provides an interface (e.g., a user interface) via which an administrator selects a containment hierarchy, selects a policy configuration (e.g., a snippet), and the system deploys the policy configuration(s) to the selected containment hierarchy. In some embodiments, the system enables sharing of configurations across the containment hierarchies, such as across tenants. As an example, the system shares a first policy configuration with both a first tenant and a second tenant, or with both a first customer's environment and a second customer's environment.

Various embodiments include a method, system, and computer system for managing policy configurations. The method includes (i) receiving a set of shared policy configurations, (ii) sharing the set of shared policy configurations across a plurality of entities, and (iii) deploying the set of shared policy configurations across the plurality of entities.

According to various embodiments, the system stores a set of pre-defined policy configurations and makes those pre-defined policy configurations available to customers of the cloud management platform. For example, the set of pre-defined policy configurations may include policy configurations defined by the cloud management platform provider or another third party such as a domain expert. Administrators for customer environments may selectively apply one or more of the pre-defined policy configurations to one or more containment objects within the containment/entity hierarchy comprised in the customer environment.

Various embodiments provide a management platform that enables management of policy configurations. Management of policy configurations may include receiving a snippet, creating a snippet, updating a snippet, associating a snippet with one or more entity hierarchies, rating or providing feedback with respect to a snippet, and deploying a snippet. The management platform (e.g., a policy management platform) is provided by a cloud provider and is configured to provide a user interface via which a user may manage the policy configurations. For example, the cloud provider enables various users associated with different environments (e.g., different tenants, different organizations/customers, etc.) to manage the snippets in the context of the applicable environment. A first user associated with a first organization, or first tenant may use the management platform to manage the policy configurations with respect to the entity hierarchy of the first organization or first tenant. In some embodiments, the management platform enables policy configurations to be shared across entity hierarchies, such as across tenants, customers, organizations, etc.

In some embodiments, the management platform receives a snippet definition (e.g., a definition for a policy configuration) or an update to a snippet definition. The snippet definition may be uploaded in connection with the upload of a set of predefined policy configurations, or the snippet may be defined based on input to the user interface. As an example, the user interface includes a selectable create snippet element via which a user requests to create a new snippet. In response to selection of the selectable create snippet element, the system configures the user interface to provide an interface via which the user inputs the snippet definition. After inputting the snippet definition, the user may select a selectable save snippet element to save the snippet, and in response to selection of the save snippet element, the system stores the snippet. The definition of the snippet may include the input or association of variables with the snippet. The snippet may be stored in a dataset of snippets (e.g., a set of shared policy configurations). In some embodiments, the system stores the snippet in connection with metadata associated with the snippet. The metadata may be input by the user in connection with the input of the snippet definition, or the system may generate the metadata upon the snippet being created. For example, the system generates and stores versioning information for the snippet such that in response to a snippet being updated, the system stores a new version of the snippet with the associated metadata indicating the applicable version. As another example, the system stores a description of the snippet, such as based on a description provided by the user when the snippet is created.

In some embodiments, the system manages the snippet to prevent changes to the snippets from contexts outside the snippet. For example, the snippets may not be changed by an entity or an administrator outside the context of the management platform or outside the specific snippet definition. Additionally, or alternatively, only users or systems with appropriate permissions are enabled to edit/change a snippet. For example, the management platform implements a role-based permissions for rule management.

In some embodiments, snippets are predefined by a user. As an example, the user is associated with the policy management platform (e.g., a cloud provider providing policy management services to the entities). As another example, the user is associated with a third party (e.g., a user associated with one of the entities, such as a tenant or customer administrator, or a user that is a domain expert, such as an expert in a particular business vertical or industry). The respective entities (e.g., administrators for the respective entities or entity hierarchies to which the entities belong) can selectively deploy a predefined snippet.

A snippet may be defined specifically for a particular entity hierarchy, such as a tenant or customer. For example, an administrator for the particular entity hierarchy may define/upload a snippet for deployment across such entity hierarchy. Alternatively, a snippet may be generally defined and shared across a plurality entities or entity hierarchies, such as across tenants, across customers, etc. The management platform may store a set of snippets that are defined within the entity hierarchy and a set of shared snippets that are shared across entities or across entity hierarchies.

In some embodiments, the management platform provides an indication of snippets available for deployment within a particular entity hierarchy or solution instance, such as by displaying the set of available snippets on a user interface by which snippets may be associated with entities or entity hierarchies. The set of available snippets may be configured based at least in part on the entity hierarchy or solution instance (e.g., the specific organization, customer, business unit, etc. for which the instance is deployed). For example, the set of available snippets is determined based on a snippet superset comprising a set of snippets that are defined within the entity hierarchy or instance solution, and a set of shared snippets (e.g., a set of shared policy configurations).

In some embodiments, the system (e.g., the management platform) provides a user interface via which a user may associate one or more snippets with one or more entities or entity hierarchies. The user interface is configured to provide an indication of a set of available snippets that may be selected by the user for association with the particular one or more entities or entity hierarchies. In response to receiving a request to associate a snippet with a particular entity or entity hierarchy, the system stores the association between the snippet and the entity or entity hierarchy. For example, the system may store a mapping of entities or entity hierarchies with corresponding associated snippets. The system or an administrator may perform an audit on deployment of snippets based at least in part on the mapping of entities or entity hierarchies with corresponding associated snippets. For example, the management platform indicates the snippets associated with a particular entity or entity hierarchy and the administrator may confirm that the applicable snippets are deployed.

In some embodiments, if a snippet is associated with an entity hierarchy, the snippet is associated with all entities within the entity hierarchy (e.g., all devices within the grouping of devices, etc.).

In response to the association of a snippet with an entity hierarchy, the snippet is deployed across such entity hierarchy. In some embodiments, the deployment of the snippet across the entity hierarchy includes the system (e.g., the management platform) causing the snippet to be deployed in response to receiving a user input to apply a snippet that has been associated with (e.g., made available with respect to) the entity hierarchy. In some embodiments, the deployment of the snippet across the entity hierarchy includes the system pushing to one or more entities within the entity hierarchy the snippet and/or an instruction to apply the snippet (e.g., enforce the corresponding policy configuration), and the corresponding entities thereafter are caused to apply the snippet. The system may push the snippet or instruction to apply a snippet to all entities within the hierarchy at one time, or in batches. As an example, as new entities are added to the entity hierarchy, such as a new instance being spun up within the entity hierarchy or a new device being deployed in the environment, the system pushes to a new entity one or more snippets associated with the entity hierarchy to which the new entity belongs).

In some embodiments, the system (e.g., the management platform) provides version control of snippets. For example, the system stores in association with each snippet metadata indicating version information for the snippet. The version information may include version identifier, a date the snippet is updated, created, or published, etc. The system may store an indication of a snippet version deployed at an entity or across an entity hierarchy. For example, the system stores a mapping of entities or entity hierarchies to snippet versions. A user (e.g., an administrator) can use the indication of the snippet version deployed at an entity or across an entity hierarchy to confirm that (e.g., audit whether) an entity or entity hierarchy is deploying the most recent snippet version or otherwise a selected snippet version. In response to determining that the entity or the entity hierarchy is not deploying the appropriate snippet version, the system may cause the entity or entity hierarchy to deploy the appropriate snippet version, such as by pushing the snippet version to the entity or entity hierarchy, etc. In some embodiments, in response to receiving an updated snippet (or an update to a stored snippet), the system provides the updated snippet to entity hierarchies with which the corresponding snippet is associated. For example, in response to receiving the updated snippet, the system pushes the updated snippet to the entity hierarchies (e.g., to the corresponding entities within the entity hierarchies). As another example, in response to receiving the updated snippet, the system provides to an administrator for the entity hierarchy an indication that an updated snippet is available, and the administrator may select to deploy the updated snippet (e.g., to update the currently deployed snippet version to the new snippet version). As another example, the system deploys the updated snippet according to a predefined update schedule or in batches across the applicable entities.

In some embodiments, the system (or an entity at which a snippet is deployed) maintains a rule set for downgrading snippets to earlier versions or to versions otherwise compatible with the systems running on entities. For example, if an updated snippet is configured to be deployed on firewalls having a version 5 of an operating system and an entity at which the snippet is deployed is currently running a version 3 of the operating system, the system or the entity downgrades the snippet to be compatible with the version 3 of the operating system. As an example, a snippet (or an updated snippet) is pushed to a firewall, and in response to receiving the snippet, the firewall determines, based on a predefined rule set, a translation according to which the snippet is to be translated in order for the firewall to deploy the snippet. The firewall then translates the snippet and deploys the compatible version of the snippet.

In contexts where a plurality of snippets is associated with an entity hierarchy, the plurality of snippets may include policy configurations that conflict with one another. The system implements a conflict resolution among policy configurations (e.g., among snippets) based on a predefined priority of the corresponding snippets. For example, the system stores a mapping of snippets associated with an entity hierarchy to corresponding priorities. The system implements the snippets based on the respective priorities of the snippets such that in the event of a conflict between a first snippet and a second snippet the system implements the snippet having the higher priority at least with respect to the conflict that exists between the first snippet and second snippet. The system (e.g., the management platform) enables a user to adjust the priorities of the snippets, such as by providing to the user a configurable listing of snippets for which the ordering of the snippets corresponds to an ordering of the priorities of the snippets.

Various embodiments provide a faster sharing of policy configurations across various use cases. The system enables more efficient management of the policy configurations. As an example, the system may manage/implement automated updates and auditing of policy configurations across an entity hierarchy. As a result, various embodiments provide improved repeatability and uniformity of policy configurations across one or more entity hierarchies. Related art systems lack repeatability and flexibility to deploy shared policy configurations across an entity hierarchy. Further, related art systems do not provide the ability for policy configurations to be shared across an entity hierarchy and maintain the enforce policy configurations according to updates to the policy configurations. As a result, related art systems generally result in increased errors for shared policy configurations as a policy configuration(s) is changed/updated and manually deployed across the entity hierarchies.

FIG. 1 is a block diagram of an environment for managing policy configurations according to various embodiments. In some embodiments, system 100 (e.g., policy configuration management platform 110) implements system 200 of FIG. 2. System 100 implements user interface 300 of FIG. 3, user interface 400 of FIG. 4, user interface 500 of FIG. 5, user interface 600 of FIG. 6, and/or user interface 700 of FIG. 7. In some embodiments, system 100 implements process 800 of FIG. 8, process 900 of FIG. 9, process 1000 of FIG. 10, process 1100 of FIG. 11, process 1200 of FIG. 12, process 1300 of FIG. 13, process 1400 of FIG. 14, and/or process 1500 of FIG. 15.

In the example illustrated in FIG. 1, system 100 includes policy configuration management platform 110, administrator system 130, and/or client system 150. System 100 may additionally include one or more data stores, such as data store 120, one or more entities such as firewall 140 and/or endpoint 160), and network 170 over which one or more of policy configuration management platform 110, client system 150, administrator system 130, and data store 120 and/or the one or more entities are connected. In some embodiments, policy configuration management platform 110 is implemented by a plurality of servers. Various instance of the management platform may be implemented for various customers of the cloud provider of the management platform. In various embodiments, network 170 includes one or more of a wired network, and/or a wireless network such as a cellular network, a wireless local area network (WLAN), or any other appropriate network. System 100 may include various other systems or terminals.

In some embodiments, policy configuration management platform 110 comprises data layer 112, policy management layer 114, and/or business application layer 116. Data layer 112, policy management layer 114, and/or business application layer 116 are respectively implemented by one or more servers. In some embodiments, data layer 112 may comprise one or more clusters of compute resources or otherwise implement a plurality of tenants (e.g., Tenant 1 and Tenant 2).

In various embodiments, policy configuration management platform 110 process snippets and provides a service for managing snippets and deployment of snippets across a plurality of entities, such as a plurality of entities within one or more selected entity hierarchies. Policy configuration management platform 110 is configured to receive snippet definitions from another system, such as client system 150, including various policy configurations that are to be enforced with respect to the snippet. In response to receiving the snippet definition, policy configuration management platform 110 (e.g., policy management layer 114) stores the snippet definition, and determines the contexts in which to make the corresponding snippet available for deployment. For example, policy configuration management platform 110 determines which customers of the management platform may deploy the snippet. As another example, policy configuration management platform 110 determines one or more entity hierarchies for which the snippet is available to be deployed, such as specific tenants, environments, etc. Policy configuration management platform 110 may determine the availability of the snippet based at least in part on one or more of the snippet definition(s), the publisher/creator of the snippet, customer settings or preferences, a business vertical or specified context for which the snippet is developed, etc.

In response to determining the contexts, environments, customers, etc. for which the snippet is to be made available, the system enables the snippet to be deployed in such contexts, environments, customers, etc. For example, policy configuration management platform 110 (e.g., policy management layer 114 or business application layer 116) configures a user interface and includes the snippet in the set of available snippets for such contexts, environments, customers, etc. Policy configuration management platform 110 receives a selection of snippets to be associated with particular entity hierarchies (e.g., hierarchies associated with contexts, environments, customers, etc., such as a grouping/folder of devices, etc.). In response to receiving an association between the snippet and one or more entity hierarchies, policy configuration management platform 110 (e.g., data layer 112) stores the association and causes the snippet (e.g., policy configuration) to be deployed across the entities within the one or more hierarchies. For example, data layer 112 stores the association, determines entities (e.g., devices, such as firewalls) within the one or more associated entity hierarchies, and communicates (e.g., pushes) the snippet to the entities.

Data layer 112 manages a cluster of compute resources or tenants to execute the business logic. The cluster of compute resources or the tenants may be associated with a same customer of the policy configuration management service (e.g., policy configuration management platform 110) or different customers. In some embodiments, policy management layer 114 obtains a definition of an entity hierarchy. An entity hierarchy may be defined to include a set of entities, such as a grouping of firewalls (e.g., an entity hierarchy comprising firewall 140), a grouping of managed devices (e.g., an entity hierarchy comprising endpoint 160), a grouping of tenants (e.g., an entity hierarchy comprising Tenant 1 and/or Tenant 2), etc. Various other entity hierarchies may be defined. In response to receiving the entity hierarchy definition(s), policy configuration management platform 110 uses data layer 112 to store the entity hierarchy definition, and policy configuration management platform 110 determines whether to make a particular snippet available for deployment to a particular entity hierarchy and/or determine whether to deploy the snippet, such as based on receiving an association between the snippet and the entity hierarchy from administrator system 130 or client system 150.

According to various embodiments, business application layer 116 provides an interface via which a user (e.g., using client system 150) may interact with various applications such as a development application for defining a snippet, an application for sharing snippets, an application for associating snippets with entity hierarchies, an application for defining entity hierarchies, etc. Various other applications can be provided by business application layer 116. For example, a user configures a snippet and deployment of a snippet by sending a query/request to business application layer 116, which interfaces with data layer 112 and/or policy management layer 114 to manage the snippet(s). As another example, an administrator uses an interface provided/configured by business application layer 116 to configure (e.g., define) one or more security policies including access permissions to information stored on data store 120, such as permissions for editing snippets, or associating snippets with entity hierarchies, etc.

Administrator system 130 comprises a system for use by an administrator. For example, administrator system 130 comprises a system for communication, data access, computation, etc. An administrator uses administrator system 130 to maintain and/or configure policy configuration management platform 110 and/or one or more of data stores (e.g., data store 120). For example, an administrator uses administrator system 130 to start and/or stop services on policy configuration management platform 110 and/or one or more of data store 120, to configure permissions for accessing policy configuration management platform 110 (e.g., to configure customer's instances and/or associated permissions for users associated with the customer), to install software on policy configuration management platform 110 and/or data store 120, etc. Administrator system 130 communicates with policy configuration management platform 110 and/or data store 120 via a web-interface. For example, administrator system 130 communicates with policy configuration management platform 110 via a web-browser installed on administrator system 130. As an example, administrator system 130 communicates with policy configuration management platform 110 via an application running on administrator system 130.

In various embodiments, an administrator (or other user associated with a tenant or entity with which the tenant is associated such as a customer) uses administrator system 130 to configure a service provided to a tenant or a customer environment. As an example, the administrator uses administrator system 130 to communicate with policy configuration management platform 110 to configure the service provided to the tenant. For example, administrator system 130 may communicates with policy configuration management platform 110 via business application layer 116. In some embodiments, business application layer 116 serves as a gateway via which the administrator may interface to manage, configure, etc. data layer 112, policy management layer 114, and/or business application layer 116. Administrator system 130 may configure one or more policies for policy configuration management platform 110, such as one or more security policies and/or one or more compute resource policies (e.g., a policy for determining compute resources, an allocation of compute resources, or a failover strategy when a compute resource fails or is otherwise re-allocated away from execution of the business logic).

Data store 120 stores one or more datasets. In various embodiments, the one or more datasets comprise snippet data, or information within the customer's environment, such as human resources data, financial data, organizational planning data, or any other appropriate data. In some embodiments, data store 120 stores one or more datasets for a plurality of tenants.

According to various embodiments, a user uses system 100 (e.g., a client or terminal, such as client system 150, that connects to system 100 via network 170) to define business logic and/or to execute such business logic with respect to data (e.g., one or more datasets) stored on data store 120, and/or snippets or entity hierarchies managed via policy configuration management platform 110. For example, a user inputs to a client terminal a snippet definition. As another example, the user inputs to the client terminal an entity hierarchy definition (e.g., a selection of a grouping of entities, etc.). As another example, the user inputs to a client terminal a selection of an association between a snippet and an entity hierarchy.

In some embodiments, data layer 112, policy management layer 114, and/or business application layer 116 are implemented on a single server or a plurality of servers. For example, data layer 112 and business application layer 116 are different modules running on a same server or set of servers.

Figure 2:
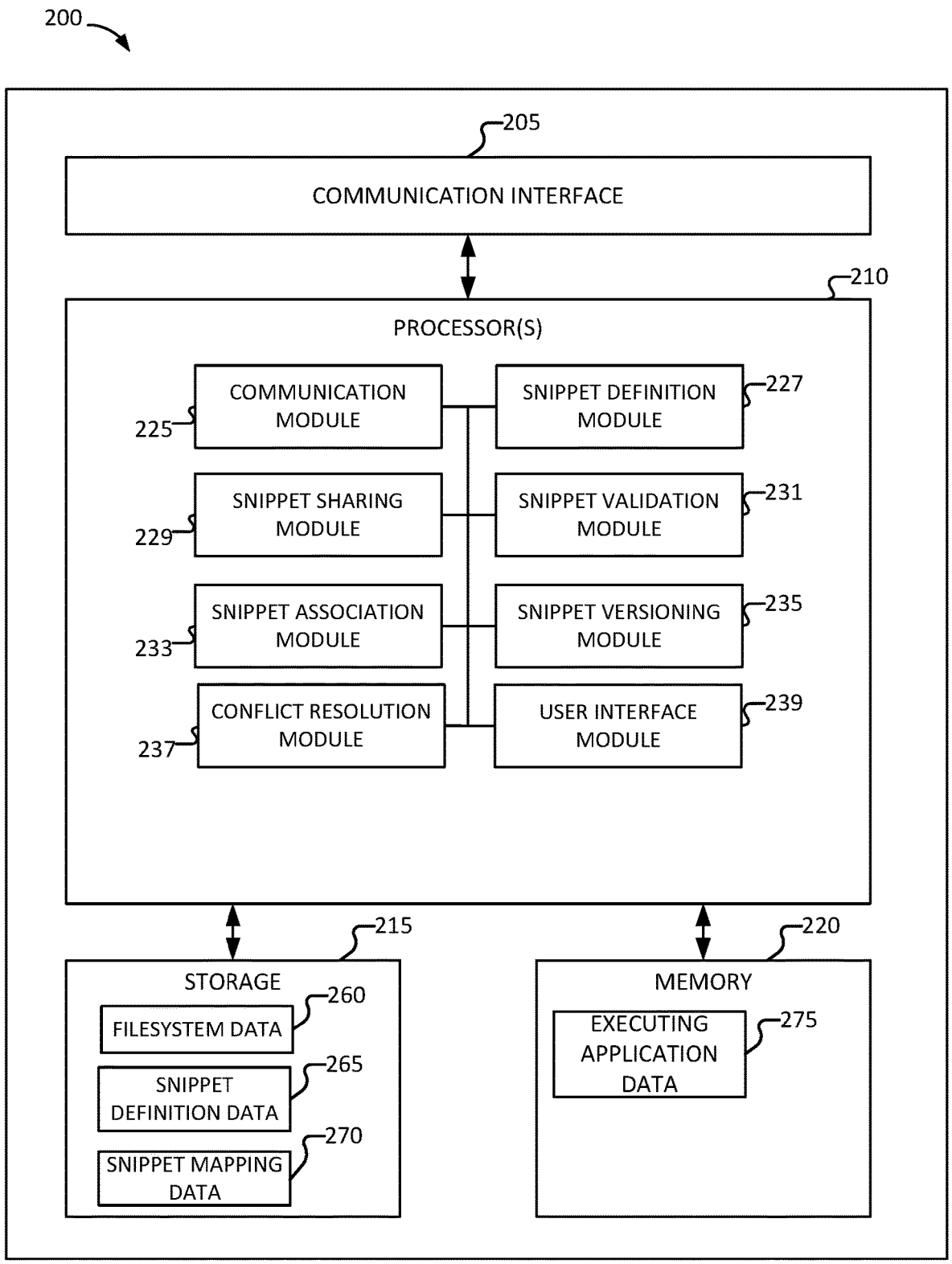
FIG. 2 is a block diagram of system for managing policy configurations according to various embodiments.

FIG. 2 is a block diagram of system for managing policy configurations according to various embodiments. In some embodiments, system 200 implements at least part of system 100 of FIG. 1, such as policy configuration management platform 110. System 200 (e.g., user interface module 239) implements user interface 300 of FIG. 3, user interface 400 of FIG. 4, user interface 500 of FIG. 5, user interface 600 of FIG. 6, and/or user interface 700 of FIG. 7. In some embodiments, system 200 implements process 800 of FIG. 8, process 900 of FIG. 9, process 1000 of FIG. 10, process 1100 of FIG. 11, process 1200 of FIG. 12, process 1300 of FIG. 13, process 1400 of FIG. 14, and/or process 1500 of FIG. 15.

System 200 can be implemented by one or more devices such as servers. As an example, system 200 is deployed as a service, such as a web service (e.g., system 200 determines traces application service communication/calls among services in the service fabric). The service may be provided by one or more servers (e.g., system 200 is deployed on a remote server that analyzes DNS log data to generate or update). As another example, the service fabric tracer is deployed on a firewall.

According to various embodiments, system 200 manages snippets (e.g., policy configurations). System 200 enables snippets to be defined, updated, and/or deployed across entity hierarchies. In some embodiments, system 200 implements a user interface via which a client system (e.g., an administrator of an environment, etc.) manages snippets and deployment of snippets within a corresponding entity hierarchy (e.g., a customer, a tenant, a grouping of devices, etc.).

In the example shown, system 200 implements one or more modules in connection with managing snippet definitions and deployments. System 200 comprises communication interface 205, one or more processors 210, storage 215, and/or memory 220. One or more processors 210 comprises one or more of communication module 225, snippet definition module 227, snippet sharing module 229, snippet validation module 231, snippet association module 233, snippet versioning module 235, conflict resolution module 237, and/or user interface module 239.

In some embodiments, system 200 comprises communication module 225. System 200 uses communication module 225 to communicate with various nodes or end points (e.g., client terminals, firewalls, DNS resolvers, data appliances, other security entities, servers, tenants, clusters of virtual machines, etc.) or user systems such as an administrator system. For example, communication module 225 provides to communication interface 205 information that is to be communicated (e.g., to another node, security entity, etc.). As another example, communication interface 205 provides to various other modules within system 200 information that communication interface 205 receives in connection with the management of snippets, such as snippet definitions, snippet updated, snippet associations, snippet deployments, metadata associated with snippets (e.g., information pertaining to snippet versioning), etc. Communication module 225 is configured to receive snippets (e.g., an upload of a predefined snippet) or snippet definitions (e.g., definitions input via a user interface provided at a client system). In response to receiving the snippets or snippet definitions, communication module 225 provides information pertaining to such snippets or snippet definitions to snippet definition module 227. Communication module 225 is further configured to receive an association of a particular snippet(s) with one or more entity hierarchies, such as based on an indication received from a client system (e.g., an administrator) that the snippet(s) is to be shared across a particular entity hierarchy.

Communication module 225 is configured to receive one or more settings or configurations from an administrator. Examples of the one or more settings or configurations include configurations of an entity hierarchy, configurations of a snippet, configurations of grouping of snippets, configurations pertaining to availability of snippets, configurations of roles that are authorized to provide snippet definitions or to update a snippet definition, etc.

In some embodiments, system 200 comprises snippet definition module 227. System 200 uses snippet definition module 227 to obtain and store a snippet definition. As an example, snippet definition module 227 is configured to receive, via an upload from a client system or another system, one or more predefined snippets. As another example, snippet definition module 227 is configured to receive the snippet definition input to a user interface provided by system 200. A user may request system 200 to create a new snippet, or to edit an existing snippet), via a user interface. In response to receiving the request to create a new snippet or edit an existing snippet, system 200 (e.g., user interface module 239) configures a user interface via which the user can input the snippet definition, including variables associated with the policy configuration, a description of the snippet, etc.

In some embodiments, snippet definition module 227 is configured to restrict the creating or editing of snippets. For example, snippet definition module 227 restricts the creating/editing of snippets based on roles-based permissions. As another example, snippet definition module 227 restricts snippets from being changed outside the context of snippet management by system 200.

In some embodiments, system 200 comprises snippet sharing module 229. System 200 uses snippet sharing module 229 to share snippets across a plurality of entity hierarchies, such as tenants, customers, etc. In response to receiving the snippet (e.g., the snippet definition), snippet sharing module 229 enables the deployment of the snippet across the plurality of entity hierarchies. For example, snippet sharing module 229 is configured to store the snippet among a set of shared snippets (e.g., a set of shared policy configurations) and to include the snippet in a list of available snippets for an entity hierarchy.

In some embodiments, snippet sharing module 229 makes a snippet available for deployment after (e.g., only after) system 200 (e.g., snippet validation module 231) performs a validation with respect to the snippet. Validation of the snippet may include determining whether the snippet introduces any vulnerabilities to the entity or entity hierarchies at which the snippet is deployed. For example, snippet validation module 231 is configured to detect malicious code or objects comprised in the snippet definition.

In some embodiments, snippets are predefined by a cloud provider (e.g., the provider that provides the management platform as a service across a plurality of entity hierarchies, such as across a plurality of tenants, customers, etc.). Snippets defined by the cloud provider may be shared (e.g., via snippet sharing module 229) across the cloud provider's customers, customers within a particular business vertical, or customers that satisfy one or more sharing criteria. In some embodiments, snippets are predefined by a customer of the cloud provider, such as an administrator associated with an entity hierarchy (e.g., a customer's administrator, etc.). Snippets defined by a customer may be deployed across entity hierarchies under the customer's implementation/environment. For example, snippet sharing module 229 may restrict (e.g., at least unless the customer provides permission for) sharing of the snippet across entity hierarchies associated with other customers. In some cases, the customer may select to share/publish the snippet with other customers, such as other customers within similar business verticals, or as part of a wider community. In some embodiments, snippets are defined by third parties, such as community contributors. System 200 may restrict sharing of snippets by third parties until the snippet has been validated in order to prevent malicious users from maliciously publishing snippets.

In some embodiments, snippet sharing module 229 shares third-party published snippets for which a score or ranking exceeds a predefined sharing threshold. The score may be a community-source score based on feedback from other snippet contributors or administrators associated with entity hierarchies. Snippet sharing module 229 is configured to restrict sharing of third-party published snippets for which a score or ranking does not exceed the predefined sharing threshold, or for which a number or percentage of negative reviews exceeds a snippet restriction threshold.

Snippet sharing module 229 may store/provide information pertaining to a publisher of the snippet to inform users of the source of the snippet before deployment. The information pertaining to the publisher may provide an indication of a community ranking or other feedback from other snippet contributors or administrators associated with entity hierarchies of customers.

In some embodiments, system 200 comprises snippet association module 233. System 200 uses snippet association module 233 to associate a snippet with an entity hierarchy. Snippet association module 233 associates the snippet with one or more entity hierarchies based at least in part on a selection of entity hierarchies for which the snippet is to be deployed. Snippet association module may receive the selection of the of entity hierarchies for which the snippet is to be deployed based on a user input to a user interface provided by user interface module 239. For example, in response to a receiving a request to associate snippets with entity hierarchies, user interface module 239 configures a user interface via which a user may select entity hierarchies for which the snippet is to be deployed. The user interface may provide a list of available snippets, and the user may select one or more available snippets and entity hierarchies for which the snippet(s) is to be deployed.

In response to associating a snippet with an entity hierarchy, snippet association module 233 stores/updates a mapping of entity hierarchies to snippets. The mapping may include an indication of a snippet version for a snippet associated with an entity hierarchy or other metadata pertaining to the snippet. Snippet association module 233 may further provide an indication of whether an entity hierarchy is deploying a most recent/updated snippet.

In some embodiments, system 200 comprises snippet versioning module 235. System 200 uses snippet versioning module 235 to manage version control of snippets. In response to a snippet being defined or updated, snippet versioning module 235 may store corresponding metadata, such as date of publication, publisher/creator, version identifier, etc. System 200 may use such metadata in connection with managing snippet versions and facilitating updating of snippets that are deployed. In some embodiments, in response to receiving an updated snippet, snippet versioning module 235 provides to a user (e.g., an administrator) associated with an entity hierarchy an indication that a snippet deployed by the entity hierarchy has been updated (e.g., that an updated or more recent snippet version is available/published). Snippet versioning module 235 may prompt the user for an indication of whether the user wants to update deployment of the snippet to a more/most recent snippet version.

In some embodiments, in response to receiving an updated snippet, system 200 pushes the updated snippet to the entity hierarchies (e.g., the entities comprised in the entity hierarchies) with which the snippet is associated. The automatic update/pushing of snippets may be configurable, such as by an administrator associated with the entity hierarchy.

In some embodiments, system 200 comprises conflict resolution module 237. System 200 uses conflict resolution module 237 to resolve conflicts among snippets (e.g., policy configurations). As an example, conflict resolution module 237 is configured to resolve conflicts among snippets based on respective priorities of the snippets. Conflicts among snippets is resolved by implementing snippets having a higher priority and then implementing snippets having a lower priority subject to the snippets having higher priorities. The priorities for snippets may be set by a user such as an administrator for an entity hierarchy. For example, the user inputs the priority to a user interface. As another example, the user orders the snippets deployed across an entity hierarchy, and the ordering of the snippets corresponds to priorities according to which conflicts among snippets are resolved.

In some embodiments, system 200 comprises user interface module 239. System 200 uses user interface module 239 to configure and provide a user interface via which system 200 provides and receives information, such as to/from another system (e.g., a client system or administrator system). User interface module 239 is configured to receive one or more of (i) requests to create snippets, (ii) snippet definitions, (iii) snippet priorities or ordering, (iv) requests to associate snippets with entity hierarchies, (v) associations between snippets and entity hierarchies, (vi) a request to deploy (e.g., push) a snippet or updated snippet to an entity hierarchy with which the snippet is associated. User interface module 239 is configured to provide notifications to another system, such as in connection with alerting the other system of a vulnerability, alerting the other system that an updated version of a deployed snippet is available, a status of a deployed snippet (e.g., whether the deployed snippet corresponds to the most recent available snippet version), etc.

According to various embodiments, storage 215 comprises one or more of filesystem data 260, snippet definition data 265, and/or snippet mapping data 270. Storage 215 comprises a shared storage (e.g., a network storage system) and/or database data, and/or user activity data.

In some embodiments, filesystem data 260 comprises a database such as one or more datasets, a whitelist for third-party published snippets (e.g., snippets deemed to be benign), a blacklist for third-party published snippets (e.g., snippets deemed to be malicious or otherwise non-satisfactory), etc.

In some embodiments, snippet definition data 265 stores a snippet definition, metadata associated with a snippet, and other information pertaining to a snippet that is shared. The snippet definition may comprise an indication of one or more variables associated with the policy configuration.

Snippet mapping data 270 comprises information pertaining associations between entity hierarchies and snippets. For example, snippet mapping data 270 comprises a mapping of entity hierarchies to snippets deployed for the entity hierarchies.

According to various embodiments, memory 220 comprises executing application data 275. Executing application data 275 comprises data obtained or used in connection with executing an application such as an application executing a malicious snippet detection process, a community snippet feedback process, etc. In embodiments, the application comprises one or more applications that perform one or more of receive and/or execute a query, generate a report and/or configure information that is responsive to an executed query k, and/or provide to a user information that is responsive to a query. Other applications comprise any other appropriate applications (e.g., an index maintenance application, a communications application, a machine learning model application, an application for detecting suspicious files, a document preparation application, a report preparation application, a user interface application, a data analysis application, an anomaly detection application, a user authentication application, a security policy management/update application, etc.).

Figure 3:
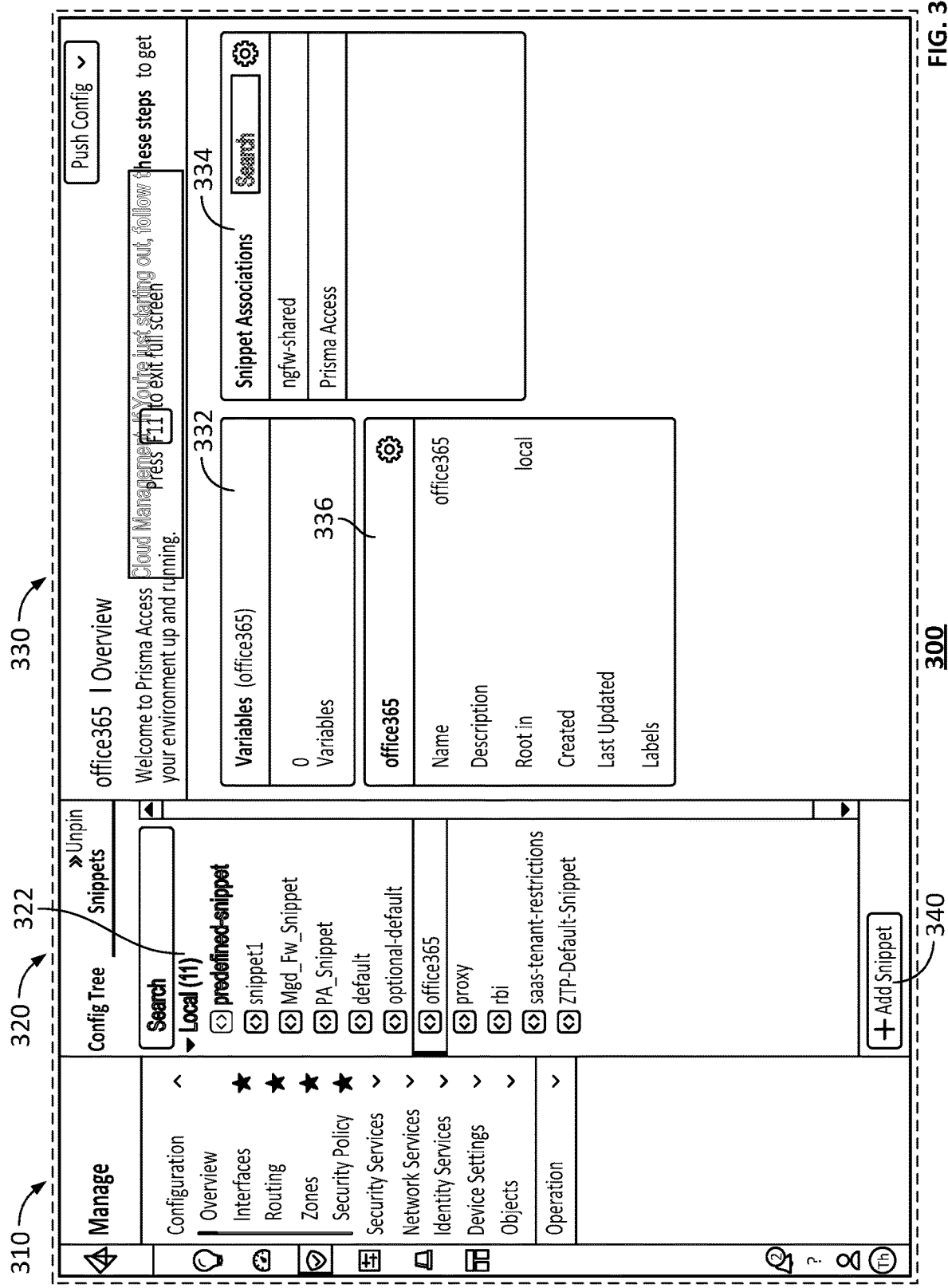
FIG. 3 is an example of a user interface for managing snippets according to various embodiments.

FIG. 3 is an example of a user interface for managing snippets according to various embodiments. According to various embodiments, user interface 300 is implemented at least in part by system 100 of FIG. 1 and/or system 200 of FIG. 2. In the example shown, user interface 300 corresponds to a user interface via which snippets are managed. User interface may comprise three frames-frame 310, frame 320, and frame 330. Frame 310 comprises a menu/list of settings that may be configured on the management platform. Frame 320 comprises a list of available snippets. Frame 330 comprises a detailed view of a selected snippet (e.g., the snippet selected via frame 320).

As illustrated in FIG. 3, frame 310 comprises a menu/list of settings that are configurable on the management platform. The element labeled "configuration overview" corresponds to a frame or user interface that displays cloud management tenant information and a high-level configuration overview across entities within the tenant/organization (e.g., firewalls deployed across the corresponding environment) or for a specified entity hierarchy, snippet, or entity scope (e.g., firewall scope). The element labeled "security services" corresponds to a frame or user interface that allows configuration of security-related services, including security policies, decryption configurations/policies, and Denial-of-Service (DOS) protection configurations. The element labeled "network policies" corresponds to a frame or user interface that allows configuration of network related policies, Network Address Translation (NAT) policies, Policy Based Forwarding (PBF) policies, and override configurations. The element labeled "identity services" corresponds to a frame or user interface that allows configuration of authentication and identity management, and/or redistribution features, such as authentication servers, Cloud Identity Engine integration, etc. The element labeled "objects" corresponds to a frame or user interface that allows configuration of, or otherwise obtaining information pertaining to, common objects that are referenced in various policies, including address objects, External Dynamic Lists (EDLs), certificates, etc. The element labeled "device settings" corresponds to a frame or user interface that allows configuration of device-specific configuration settings, including zones, interfaces, service routes, routing, etc.

In response to selection of element labeled "configuration overview" under frame 310, user interface 300 provides frame 320 and/or frame 330. As illustrated, frame 320 includes a list of available snippets 322. Upon selection of a snippet from the list of available snippets 322, user interface 300 provides frame 330. In the example shown, the snippet having the name "office365" is selected. In response to selection of the "office365" snippet, frame 330 is configured to provide information pertaining to the "office365" snippet. For example, frame 330 is configured to include a list of variables associated with the snippet 332, a list of associations for the snippet 334 (e.g., an indication of entity hierarchies with which the snippet is associated or for which the snippet is deployed, etc.), and snippet metadata 336, including snippet name, snippet creation date, snippet update date, snippet labels, snippet description, etc. Frame 330 may enable a user to add variables to the selected snippet.

In some embodiments, user interface 300 comprises selectable element 340. In response to selection of selectable element 340, the system performs a snippet creation process. For example, the system configures a user interface via which a snippet definition is to be input by the user.

When a snippet is injected into the system (e.g., a snippet is defined in the system), the snippet is available for an administrator to use in a selected entity hierarchy. Once a policy configuration is associated with an entity hierarchy (e.g., a containment object), it becomes part of the entity hierarchy configuration (e.g., the policy configuration is injected to the entity hierarchy).

Figure 4:
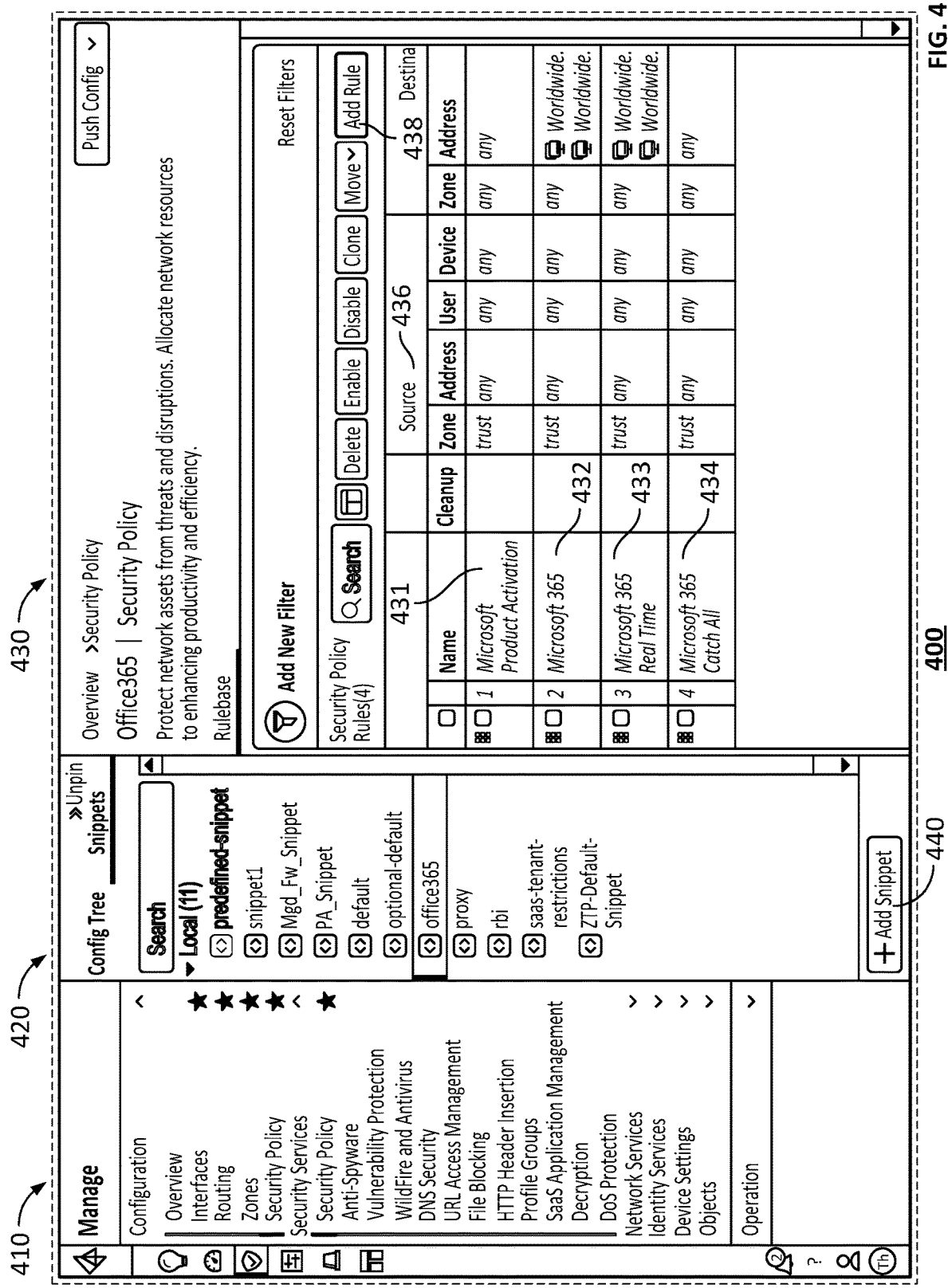
FIG. 4 is an example of a user interface for creating snippets according to various embodiments.

FIG. 4 is an example of a user interface for creating snippets according to various embodiments. According to various embodiments, user interface 400 is implemented at least in part by system 100 of FIG. 1 and/or system 200 of FIG. 2. In the example shown, user interface 400 corresponds to a user interface via which a selected snippet is configured. User interface 400 may comprise three frames-frame 410, frame 420, and frame 430. Frame 410 comprises a menu/list of settings that may be configured on the management platform. Frame 420 comprises a list of available snippets (e.g., snippets that have been previously defined and/or validated). Frame 430 comprises a detailed view of a selected snippet (e.g., the snippet selected via frame 420).

Frame 410 corresponds to, or is similar to, frame 310 of user interface 300. In the example illustrated, the menu element labeled "Security Policy" is selected. In response to selection of the security policy, the system (e.g., the management platform) configures frames 420 and/or 430.

As illustrated in FIG. 4, frame 420 comprises a list of available snippets. The list of available snippets comprises snippets that may be selectively deployed across an entity hierarchy, such as a tenant, a customer, etc. In the example shown, the "office365" snippet is selected. In response to selection of the "office365" snippet, user interface 400 configures and provides frame 430 corresponding to a detailed view of the selected snippet. Frame 430 comprises an indication (e.g., a listing) of rules that are defined in the snippet. For example, frame 430 identifies the security policy rules 431-434 that are defined in the "office365" snippet. Frame 430 may enable selection of one or more of the security policy rules 431-434 in connection with editing the security policy rule, deleting, or disabling the security policy rule, moving the security policy rule, and/or copying the security policy rule. Frame 430 may further provide detailed information 436 pertaining to the respective security policy rules 431-434. In some embodiments, frame 430 comprises selectable element 438 via which a new rule may be defined for the selected snippet. In response to selection of selectable element 438, the system configures a user interface via which the rule definition is input, and in response to inputting the rule definition, the snippet is correspondingly updated (e.g., which may cause the updated snippet version to be pushed to entity hierarchies with which the snippet is associated, or an alert to be provided to an entity hierarchy administrator to select whether to deploy the updated snippet version).

In some embodiments, user interface 400 comprises selectable element 440. In response to selection of selectable element 440, the system performs a snippet creation process. For example, the system configures a user interface via which a snippet definition is to be input by the user.

FIG. 5 is an example of a user interface for associating snippets according to various embodiments. According to various embodiments, user interface 500 is implemented at least in part by system 100 of FIG. 1 and/or system 200 of FIG. 2. In the example shown, user interface 500 corresponds to a user interface via which a selected snippet is associated with one or more entity hierarchies (e.g., predefined groupings/folders of devices or other entities, etc.). Frame 510 of user interface 500 comprises a set of entity hierarchies 512 in the system (e.g., in the customer's environment, etc.). The entity hierarchies 512 defined in the system may comprise a predefined grouping of users, a predefined grouping of networks, a predefined grouping of service connections, a predefined grouping of devices such as firewalls, a predefined subset of the devices such as firewalls at a particular location or system instance, etc. Frame 510 comprises selectable elements such as selectable element 514 via which a user may quickly and easily select an entity hierarchy with which to associate the snippet.

Figure 6:
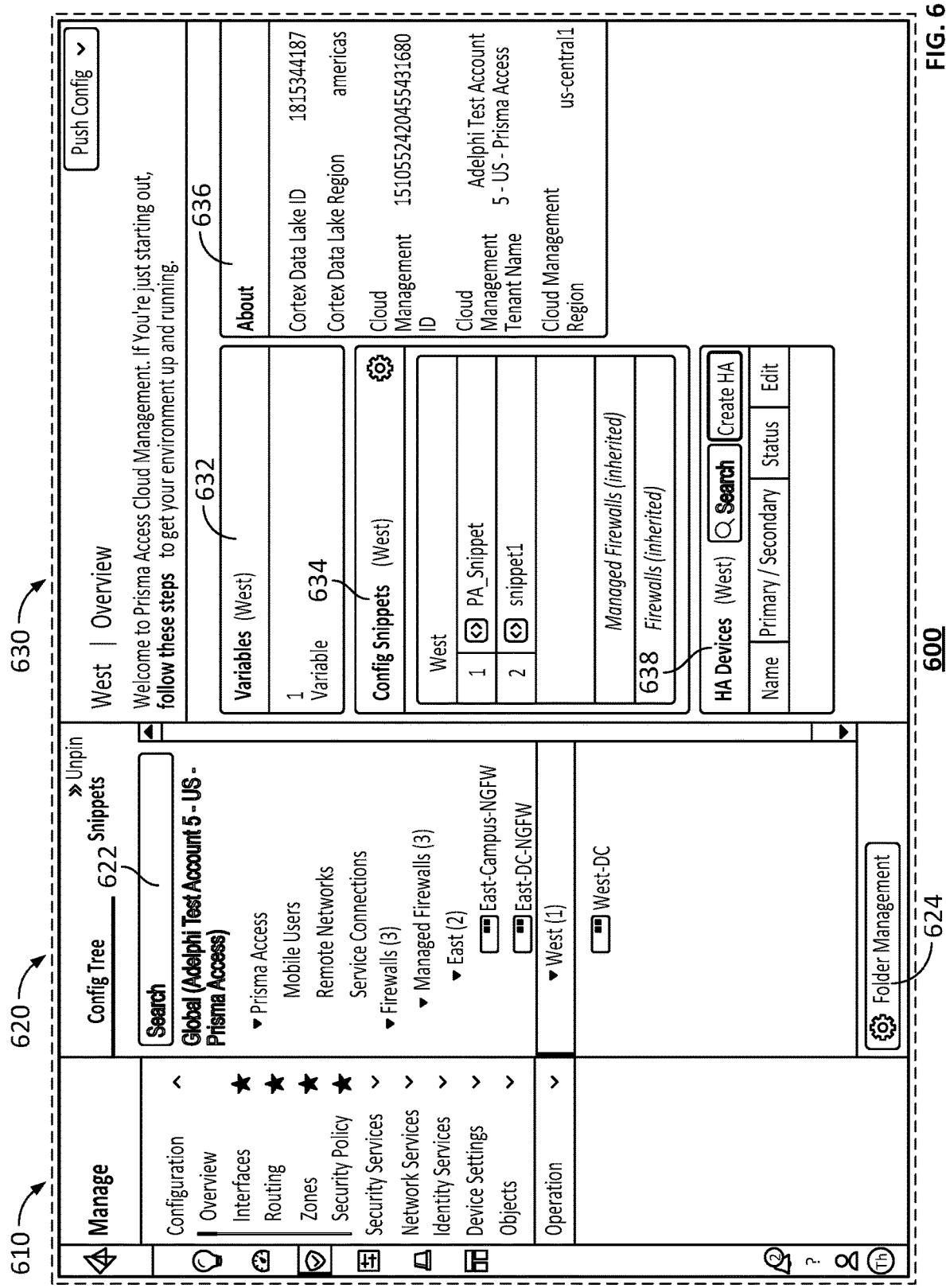
FIG. 6 is an example of a user interface for managing snippets associated with a particular entity hierarchy according to various embodiments.

FIG. 6 is an example of a user interface for managing snippets associated with a particular entity hierarchy according to various embodiments. According to various embodiments, user interface 600 is implemented at least in part by system 100 of FIG. 1 and/or system 200 of FIG. 2. User interface 600 is implemented to manage entity hierarchy configurations, including managing snippets associated with a selected entity hierarchy. User interface 600 may comprise three frames-frame 610, frame 620, and frame 630. Frame 610 comprises a menu/list of settings that may be configured on the management platform. Frame 620 comprises a list of available entity hierarchies (e.g., entity hierarchies associated with the customer of the management platform, etc.). Frame 630 comprises a detailed view of a selected entity hierarchy.

Frame 610 corresponds to, or is similar to, frame 310 of user interface 300. In the example illustrated, the menu element labeled "Overview" is selected and the selectable element "config tree" in frame 620 is selected. In response to selection of the "Overview" element, the system (e.g., the management platform) configures frames 620 and/or 630.

As illustrated in FIG. 6, frame 620 comprises a list of entity hierarchies 622, such as a set of entity hierarchies defined for a particular environment or customer of the management platform. The entity hierarchies defined in the system may comprise a predefined grouping of users, a predefined grouping of networks, a predefined grouping of service connections, a predefined grouping of devices such as firewalls, a predefined subset of the devices such as firewalls at a particular location or system instance, etc. In response to selection of an entity hierarchy from among the list of entity hierarchies 622, the system configures frame 630. In the example shown, the entity hierarchy labeled as "West" is selected, and frame 630 is correspondingly configured to provide a detailed view comprising information pertaining to the entity hierarchy. In some embodiments, frame 620 further comprises selectable element 624 corresponding to a request to define a new entity hierarchy. In response to selection of selectable element 624, the system configures a user interface via which a new entity hierarchy may be defined (e.g., a set of available entities within the customer's environment may be provided and the suer may select a set of entities or otherwise a set of characteristics that is used to filter/select the entities).

In response to selection of the entity hierarchy, the system configures frame 630 to correspondingly provide a detailed overview of the selected entity hierarchy. In the example shown, frame 630 is configured to provide a detailed overview of the "West" entity hierarchy. Frame 630 comprises information pertaining to variables 632 applied with respect to the entity hierarchy, a list of associated snippets 634, metadata 636 associated with the data entity, and a list of associated devices 639. Metadata 636 may comprise information for the selected entity hierarchy such as a data lake identifier, a region identifier, a cloud management identifier, a tenant identifier, a cloud management region identifier, etc.

In some embodiments, the list of associated snippets 634 includes an ordering of snippets associated with the entity hierarchy. The ordering of the snippets may be configurable. For example, a user can select a snippet and drag the snippet to the desired place in the list of associated snippets 634. According to various embodiments, the ordering of the snippets in the list of associated snippets 634 is used in connection with conflict resolution. For example, the ordering of the snippets corresponds to the relative priorities for the snippets. In the example shown, the snippet named "PA_snippet" occurs first in the list of associated snippets 634, and the snippet named "snippet1" occurs second in the list of associated snippets 634. Based at least in part on the ordering of the snippets, the system deems the snippet named "PA_snippet" to have a higher priority than the snippet named "snippet1" and thus any conflict between the two snippets is resolved in favor of the higher priority snippet (e.g., the snippet named "PA_snippet").

Figure 7:
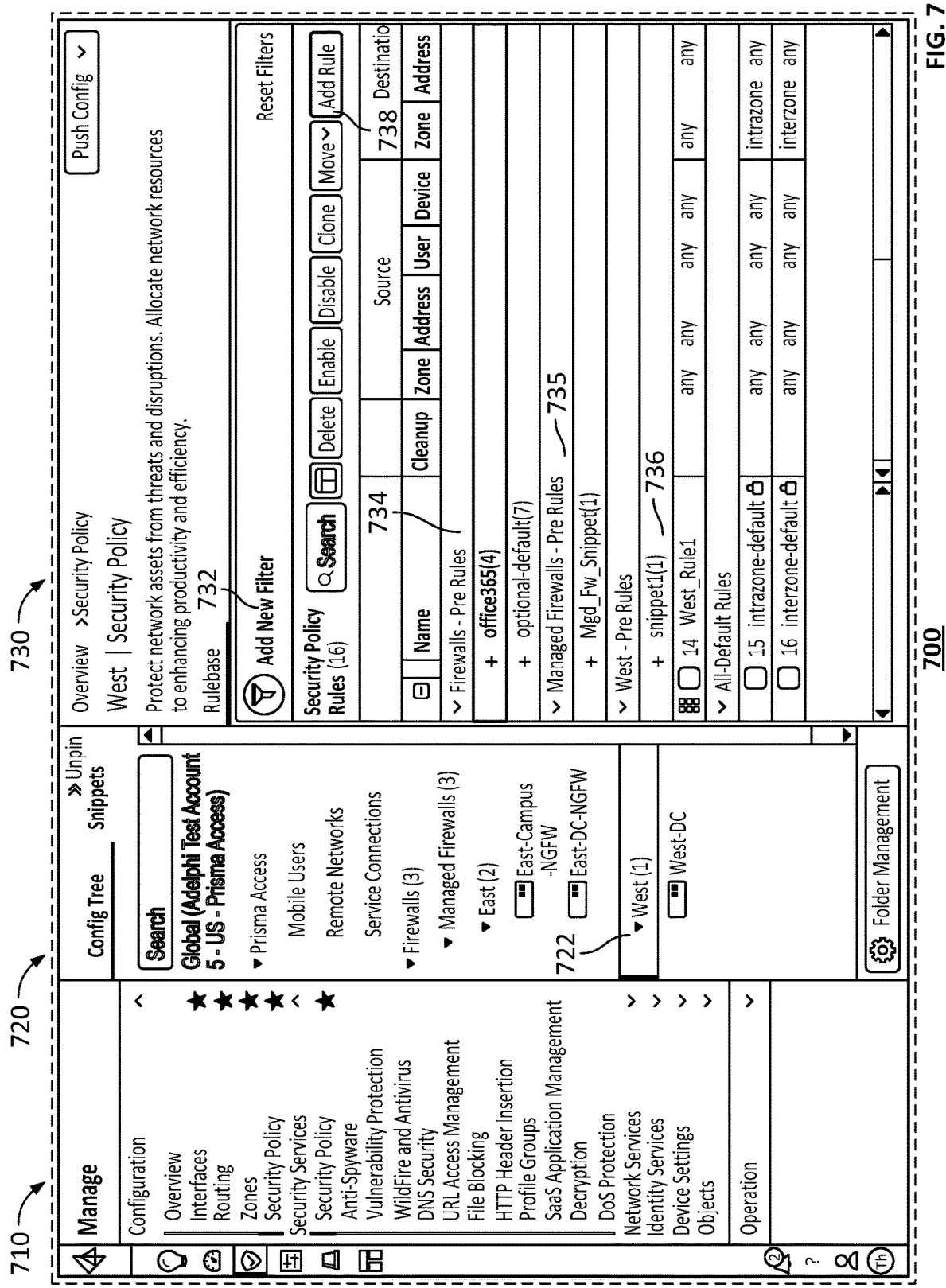
FIG. 7 is an example of a user interface for managing snippets associated with a particular entity hierarchy according to various embodiments.

FIG. 7 is an example of a user interface for managing snippets associated with a particular entity hierarchy according to various embodiments. According to various embodiments, user interface 700 is implemented at least in part by system 100 of FIG. 1 and/or system 200 of FIG. 2. In some embodiments, user interface 700 is implemented to identify how snippets are used within security policies. User interface 700 may comprise three frames-frame 710, frame 720, and frame 730. Frame 710 comprises a menu/list of settings that may be configured on the management platform. Frame 720 comprises a list of available entity hierarchies (e.g., entity hierarchies associated with the customer of the management platform, etc.). Frame 730 comprises a detailed view of a security policies associated with the selected entity hierarchy.

Frame 710 corresponds to, or is similar to, frame 310 of user interface 300. In the example illustrated, the menu element labeled "Security Policy" is selected and the selectable element "config tree" in frame 720 is selected. In response to selection of the "Security Policy" element, the system (e.g., the management platform) configures frames 720 and/or 730.

As illustrated in FIG. 7, frame 720 comprise a hierarchical view of the defined entity hierarchies. Each entity hierarchy may have sub-hierarchies. For example, the entity hierarchy "firewalls" has a sub-hierarchy of "managed firewalls", which in turn has a sub-hierarchy corresponding to grouping of firewalls in two groupings: "East" and "West". As illustrated, each of the entity hierarchy groupings "East" and "West" comprises a set of entities/devices. In the example shown, the entity hierarchy corresponding to the "West" grouping of managed firewalls 722 is selected and frame 730 is correspondingly configured to provide a detailed view comprising information pertaining to the security policies associated with the selected entity hierarchy. In some embodiments, frame 720 further comprises selectable element 724 corresponding to a request to define a new entity hierarchy. In response to selection of selectable element 724, the system configures a user interface via which a new entity hierarchy may be defined (e.g., a set of available entities within the customer's environment may be provided and the suer may select a set of entities or otherwise a set of characteristics that is used to filter/select the entities).

In response to selection of the entity hierarchy, the system configures frame 730 to correspondingly provide a detailed overview of the selected entity hierarchy. In the example shown, frame 730 is configured to provide a detailed overview of the security policies (e.g., security policy rules) being enforced at the selected hierarchy. Frame 730 may include a filtering element, which upon selection allows the user to filter the security policy rules being enforced. In some embodiments, the policy rules (e.g., security policy rules) being enforced at an entity hierarchy includes any policy rules associated with all parent entity hierarchies in the hierarchy for the environment (e.g., policy rules comprised in snippets associated with the corresponding entity hierarchy). For example, frame 730 indicates the various snippets enforced at each hierarchy associated with the entity hierarchy. Because the entity hierarchy "West" is a sub-hierarchy of the entity hierarchy "Managed Firewalls", which is in turn a sub-hierarchy of the entity hierarchy "Firewalls", the system enforces snippets/policy rules for each entity hierarchy. Frame 730 includes (i) a list of snippets associated with, and enforced by, the entity hierarchy "Firewalls" 734, (ii) a list of snippets associated with, and enforced by, the entity hierarchy "Managed Firewalls" 735, and (iii) a list of snippets associated with, and enforced by, the entity hierarchy "West" 736. Frame 730 may further identify a set of snippets or policy rules that are being applied by default (e.g., policy rules not associated with any one entity hierarchy). Frame 730 may further comprise selectable element 738 which a new rule may be defined for the selected snippet. The new rule may be automatically associated with the selected entity hierarchy (e.g., the entity hierarchy "West"). In response to selection of selectable element 738, the system configures a user interface via which the rule definition is input, and in response to inputting the rule definition, the snippet is correspondingly updated (e.g., which may cause the updated snippet version to be pushed to entity hierarchies with which the snippet is associated, or an alert to be provided to an entity hierarchy administrator to select whether to deploy the updated snippet version).

Figure 8:
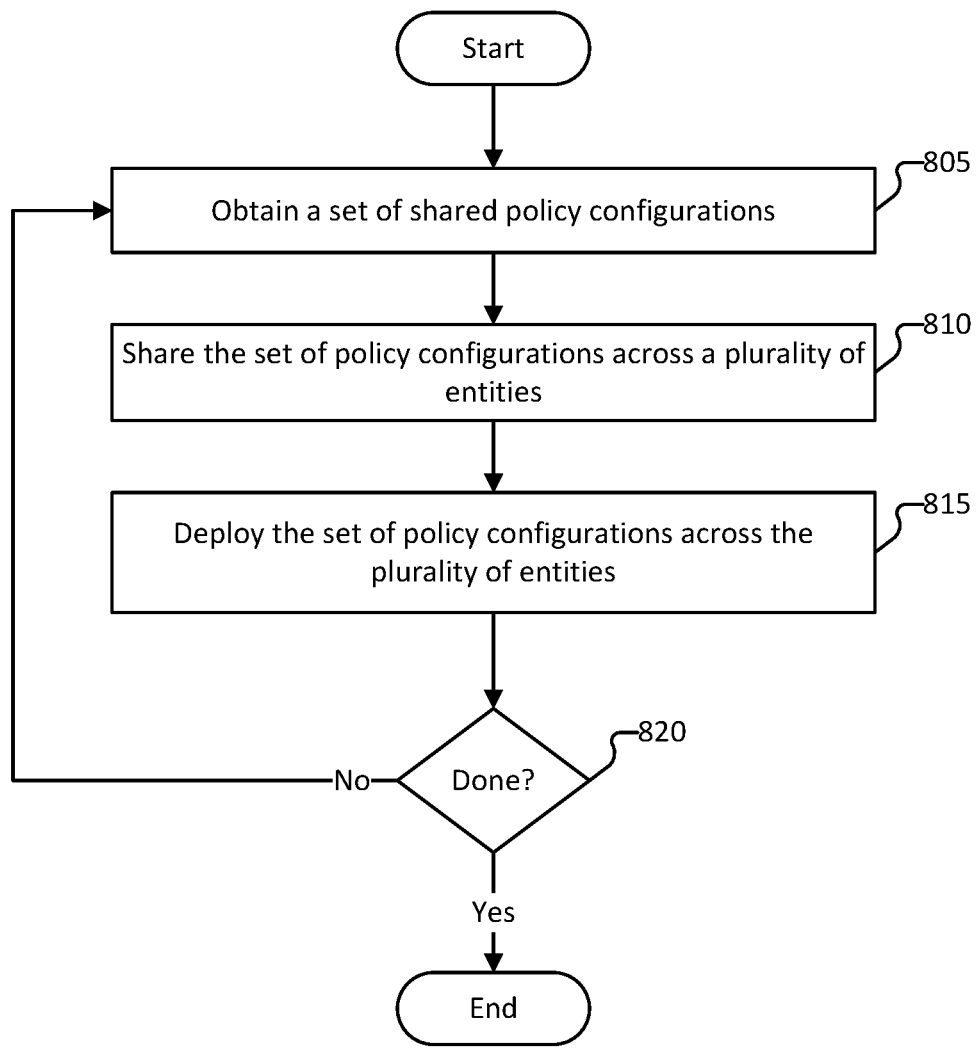
FIG. 8 is a flow diagram of a method for deploying a set of shared policy configurations according to various embodiments.

FIG. 8 is a flow diagram of a method for deploying a set of shared policy configurations according to various embodiments. According to various embodiments, process 800 is implemented at least in part by system 100 of FIG. 1 and/or system 200 of FIG. 2.

At 805, a set of shared policy configurations is obtained. In some embodiments, the set of shared policy configurations comprise a set of shared snippets. The system obtains the set of shared policy configurations from another system such as via upload by a client system, or input by a user such as an administrator of an entity hierarchy (e.g., a tenant, a customer, etc.). In some embodiments, one or more of the snippets are community-sourced. For example, the management platform provides a community system via which third-party developers or domain experts may upload snippets that may be used across various business verticals or contexts.

At 810, the set of shared policy configurations is shared across a plurality of entities. In some embodiments, the plurality of entities comprises entities in different environments, tenants, customer systems, etc. For example, the set of policy shared configurations is made available to a plurality of the management platform's customers (e.g., instances of the management platform). In some embodiments, the set of shared policy configurations is shared across a particular customer's system (e.g., environments, instances, tenants, etc.). For example, a user associated with the particular customer may define custom policy configurations (e.g., snippets) that are to be deployed across the entity hierarchies of the customer's system. A policy configuration defined by one particular customer may be selectively shared to one or more other customers or a community, such as based on the particular indicating that the policy configuration is to be made available to entity hierarchies outside the particular customer's system.

In some embodiments, a snippet is shared across a plurality of entities in response to the snippet being validated. For example, the system validates the snippet to confirm that the snippet is not malicious and is otherwise functional.

At 815, the set of shared policy configurations are deployed across the plurality of entities. In some embodiments, one or more of the policy configurations (e.g., snippets) are selectively deployed based on organizational preferences, default settings across business verticals or contexts, or user input such as from an administrator of an entity hierarchy. As an example, the system configures a user interface via which a set of available snippets (e.g., the set of policy configurations being shared) is identified, and a user may select policy configurations to be deployed. Selection of the policy configurations to be deployed includes the user associating the selected policy configurations with one or more entity hierarchies. For example, the user selects the entity hierarchies across which the selected policy configuration is to be deployed, and the system stores the association such as in a mapping of entity hierarchies to deployed policy configurations. In response to the system associating a shared policy configuration with one or more entity hierarchies, the system determines entities within the one or more entity hierarchies and communicates the shared policy configuration to the various entities. For example, the shared policy configuration is pushed to the various entities upon association of the shared policy configuration with a corresponding entity hierarchy. As another example, the shared policy configuration is communicated to the various entities in response to a user input. As a further example, the shared policy configuration is communicated to the various entities according to a predetermined period of time. The system may sync shared policy configurations with entities according to a predetermined frequency.

At 820, a determination is made as to whether process 800 is complete. In some embodiments, process 800 is determined to be complete in response to a determination that no further data snippets or policy configurations are to be deployed, the process has terminated, an administrator indicates that process 800 is to be paused or stopped, etc. In response to a determination that process 800 is complete, process 800 ends. In response to a determination that process 800 is not complete, process 800 returns to 805.

Figure 9:
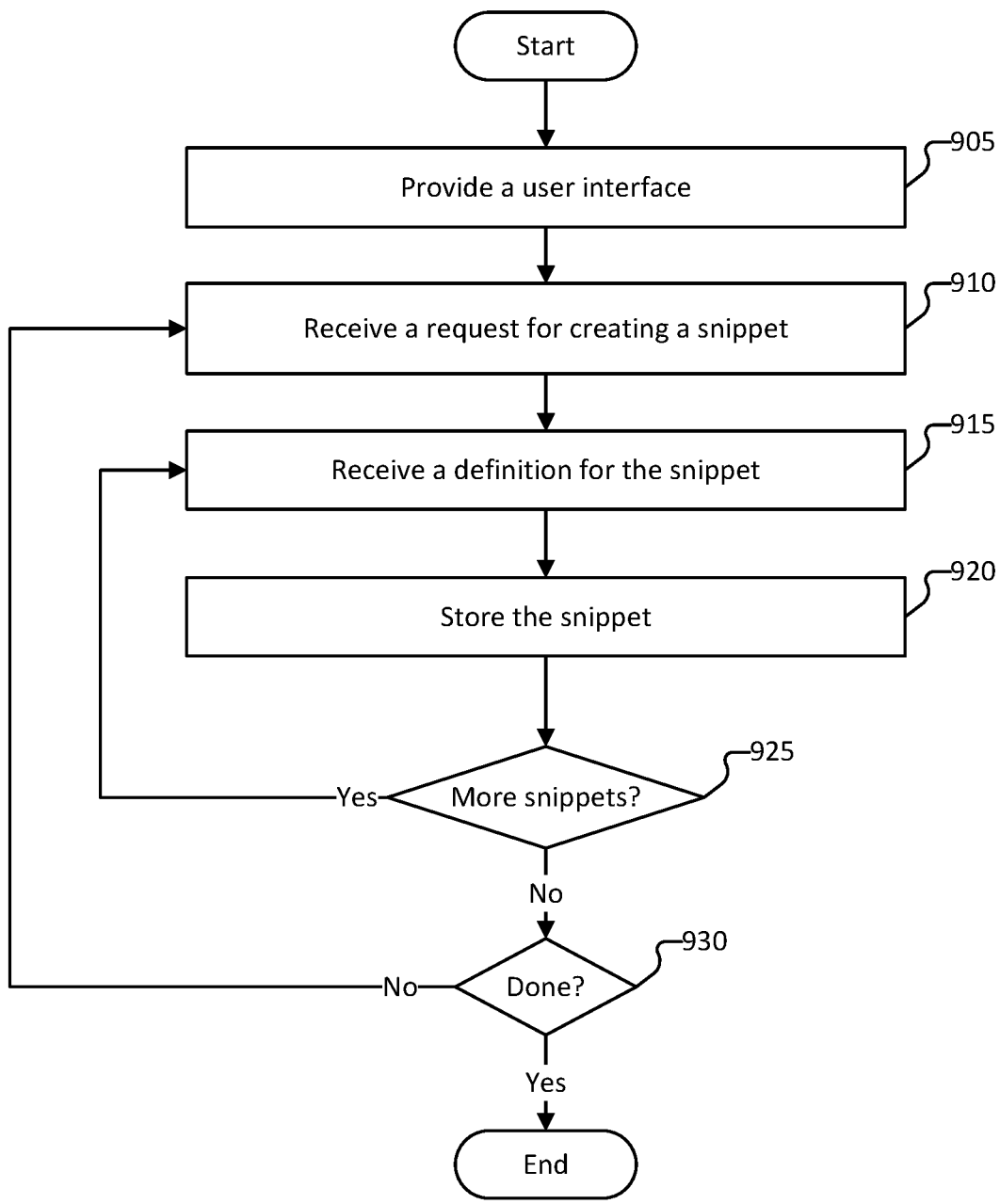
FIG. 9 is a flow diagram of a method for configuring a snippet according to various embodiments.

FIG. 9 is a flow diagram of a method for configuring a snippet according to various embodiments. According to various embodiments, process 900 is implemented at least in part by system 100 of FIG. 1 and/or system 200 of FIG. 2. In some embodiments, process 900 is invoked by 805 of process 800 of FIG. 8.

At 905, a user interface is provided. The system configures a user interface and causes a client system to display the user interface, such as via a browser or application running on the client system. The user interface may provide an overview of the management platform (e.g., the customer's instance of the management platform), including an overview of snippets or policy configurations that are available or deployed, an overview of entity hierarchies defined within the system (e.g., entity hierarchies within the customer's system), etc.

At 910, a request for creating a snippet is received. The system receives the request from a user such as an administrator for a particular customer. The receiving the request for creating the snippet may include the selection of a selectable element displayed on the user interface (e.g., a button on the user interface).

In some embodiments, in response to the request for creating the snippet is received, the system configures the user interface to include one or more elements (e.g., frames, dialog boxes, etc.) via which the snippet definition may be input. For example, the user interface provides one or more elements via which variables in the snippet, metadata for the snippet, rules for the snippet, etc. may be defined.

At 915, a definition for the snippet is received. In response to the system receiving the request for creating a snippet, the system receives from the other system (e.g., the client system such as via the user interface) the snippet definition. As an example, the user configures/inputs the snippet definition to the user interface.

At 920, the snippet is stored. In response to the snippet definition being received, the system stores the snippet. As an example, the system stores the snippet in response to the user using the user interface to select a selectable element corresponding to a save function.

In connection with storing the snippet, the system makes the snippet available at least within the context of the user. For example, the snippet is made available for the contexts for the particular customer with which the user of the client system is associated. The snippet may be made available to the various entity hierarchies managed by the user, or various entity hierarchies associated with the customer. In some embodiments, the extent to which the snippet is shared or made available is based at least in part on a sharing definition provided by the user (e.g., the snippet publisher). As an example, the cloud provider of the management platform may define a set of snippets that are to be made available to various customers of the management platform (e.g., to various instances of the management platform).

At 925, the system determines whether another snippet is to be created. In response to determining that another snippet is to be created at 925, process 900 returns to 915 and the definition for the other snippet is received. Process 900 iterates over 915-925 until the system determines that no further snippets are to be created. In response to determining that no further snippets are to be created at 925, process 900 proceeds to 930.

At 930, a determination is made as to whether process 900 is complete. In some embodiments, process 900 is determined to be complete in response to a determination that no further data snippets or policy configurations are to be deployed, no further snippets are to be configured or defined, the process has terminated, an administrator indicates that process 900 is to be paused or stopped, etc. In response to a determination that process 900 is complete, process 900 ends. In response to a determination that process 900 is not complete, process 900 returns to 905.

Figure 10:
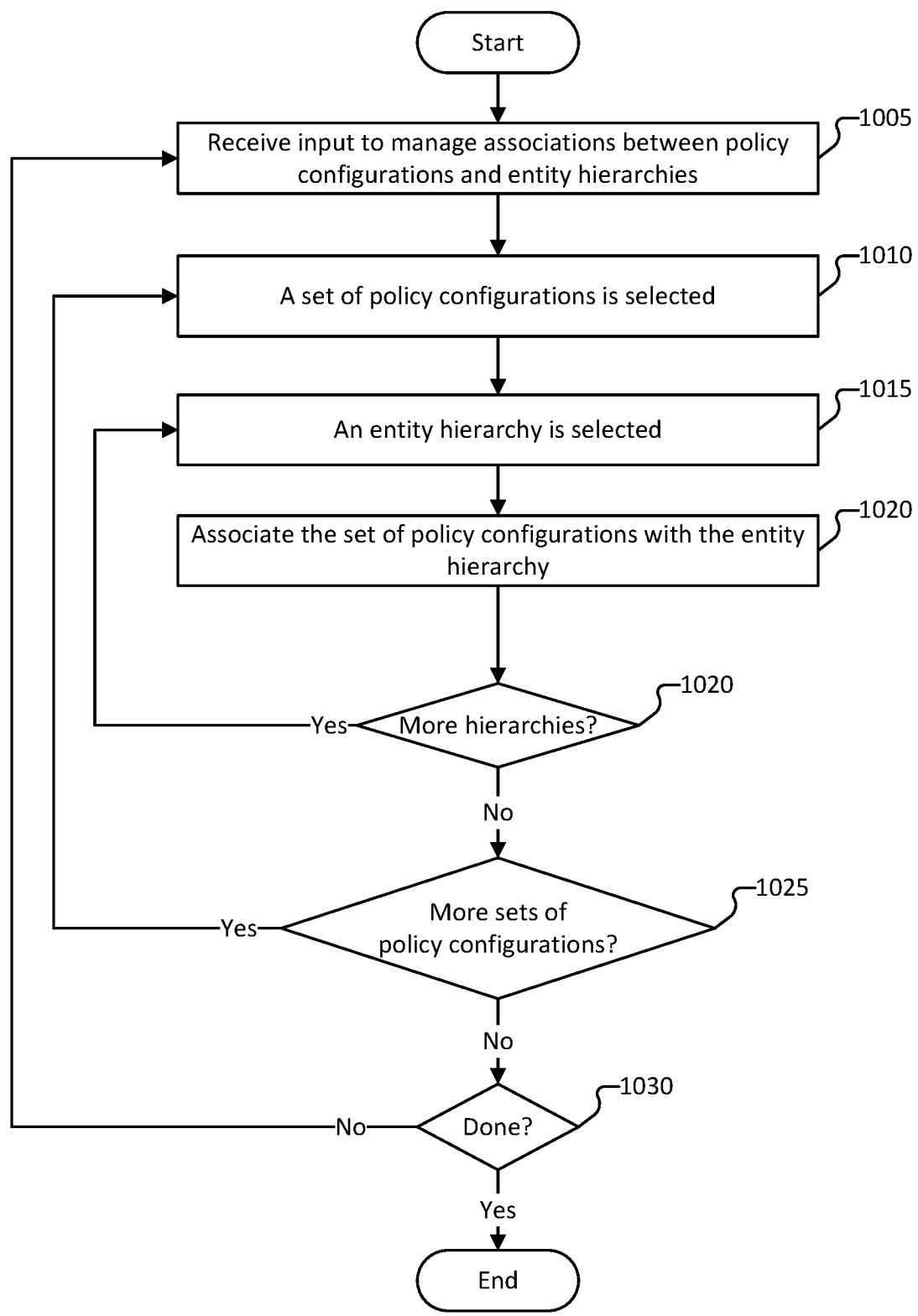
FIG. 10 is a flow diagram of a method for associating snippets with entity hierarchies according to various embodiments.

FIG. 10 is a flow diagram of a method for associating snippets with entity hierarchies according to various embodiments. According to various embodiments, process 1000 is implemented at least in part by system 100 of FIG. 1 and/or system 200 of FIG. 2. In some embodiments, process 1000 is invoked by 810 of process 800 of FIG. 8.

At 1005, an input to manage associations between policy configurations and entity hierarchies are received. The system configures a user interface and causes a client system to display the user interface, such as via a browser or application running on the client system. The user interface may provide one or more elements via which the user manages deployment of policy configurations (e.g., snippets) across entity hierarchies. For example, the user interface is configured to enable selection of associations between snippets and entity hierarchies that are defined and/or made available within the system.

At 1010, a set of policy configurations is selected. For example, the system receives a selection of the set of policy configurations via a user interface. The user interface may provide a list of available policy configurations and corresponding selectable elements via which the selection is input.

At 1015, an entity hierarchy is selected. For example, the system receives a selection of the entity hierarchy via a user interface. The user interface is configured to provide a list of entity hierarchies that are defined within the system. The user interface may be configured to provide, for each entity hierarchy in the list of entity hierarchies, a corresponding selectable element via which an entity hierarchy is selected. In response to selection of the set of policy configurations, the user interface is configured to receive a selection of the entity hierarchies with which the set of policy configurations is to be associated. The user can use the user interface (e.g., the management platform) to quickly associate snippets with entity hierarchies for deployment of the snippets across various contexts or entity hierarchies. According to various embodiments and in contrast to related art systems, the user is not required to specifically define the snippet within each entity hierarchy.

At 1020, the system determines whether the selected set of policy configurations is to be associated with another entity hierarchy. In response to determining that the selected set of policy configurations is to be associated with another entity hierarchy at 1020, process 1000 returns to 1015 and process 1000 iterates over 1015-1020 until the selected set of policy configurations is not to be associated with a further entity hierarchy. Conversely, in response to determining that the selected set of policy configurations is not to be associated with any further entity hierarchies at 1020, process 1000 proceeds to 1025.

At 1025, the system determines whether another set of policy configurations is to be associated with one or more entity hierarchies. In response to determining that another set of policy configurations is to be associated with one or more entity hierarchies at 1025, process 1000 returns to 1010 and process 1000 iterates over 1010-1025 until no further sets of policy configurations are to be associated with an entity hierarchy. In response to determining that no further sets of policy configurations are to be associated with an entity hierarchy at 1025, process 1000 proceeds to 1030.

At 1030, a determination is made as to whether process 1000 is complete. In some embodiments, process 1000 is determined to be complete in response to a determination that no further snippets are to be associated with an entity hierarchy, the process has terminated, an administrator indicates that process 1000 is to be paused or stopped, etc. In response to a determination that process 1000 is complete, process 1000 ends. In response to a determination that process 1000 is not complete, process 1000 returns to 1005.

Figure 11:
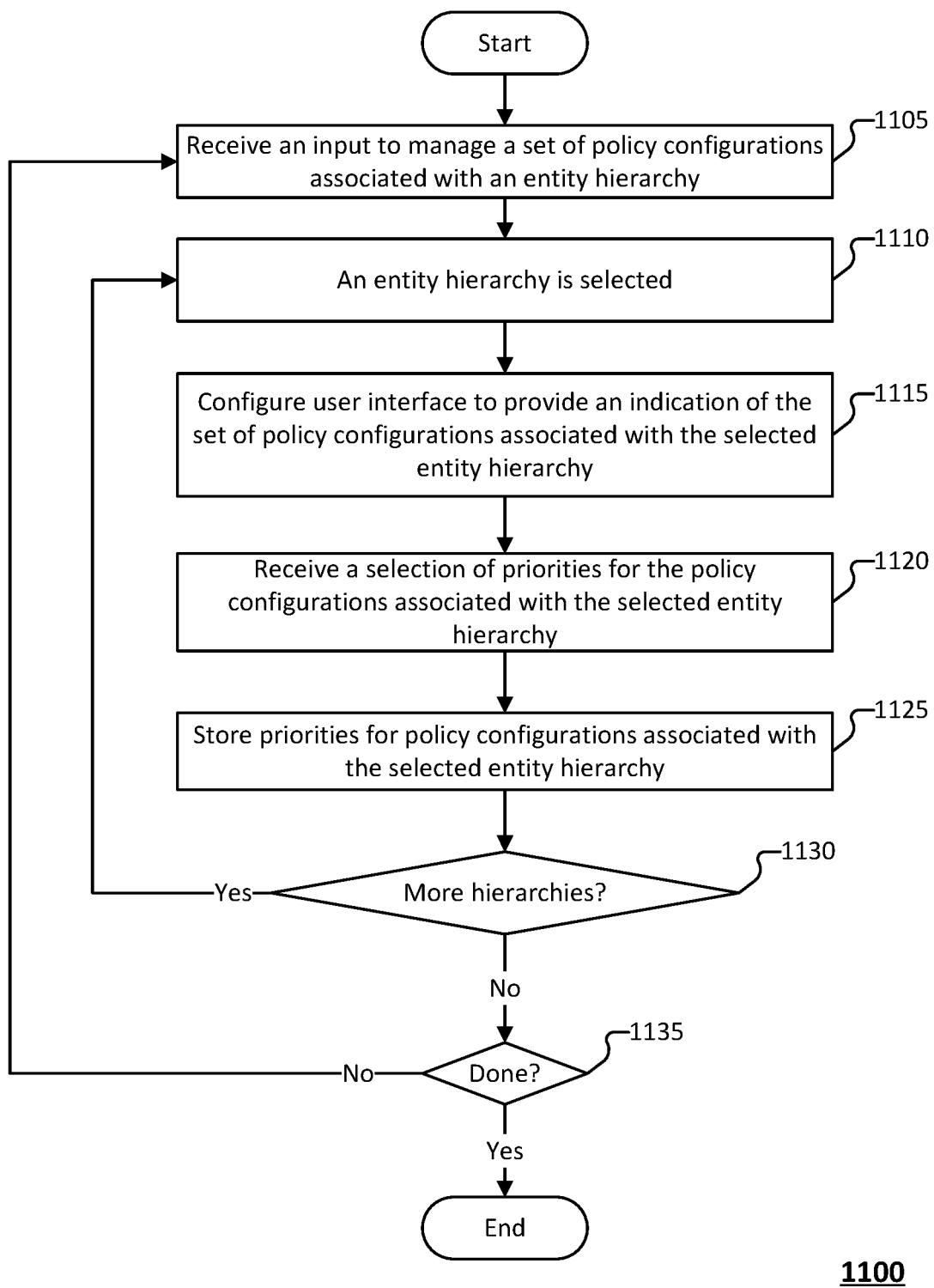
FIG. 11 is a flow diagram of a method for managing snippets associated with an entity hierarchy according to various embodiments.

FIG. 11 is a flow diagram of a method for managing snippets associated with an entity hierarchy according to various embodiments. According to various embodiments, process 1100 is implemented at least in part by system 100 of FIG. 1 and/or system 200 of FIG. 2. In some embodiments, process 1100 is invoked by 810 of process 800 of FIG. 8.

At 1105, an input to manage the set of policy configurations associated with an entity hierarchy is received. The system configures a user interface and causes a client system to display the user interface, such as via a browser or application running on the client system. The user interface may provide an overview of the entity hierarchies, such as indications of snippets associated with a particular entity hierarchy, etc. The user interface include one or more elements via which the user manages settings for a selected entity hierarchy. For example, the user interface is configured to enable selection an entity hierarchy and further configuration of settings or information pertaining to the selected entity hierarchy.

At 1110, an entity hierarchy is selected. For example, the system receives a selection of the entity hierarchy via a user interface.

At 1115, a user interface is configured to provide an indication of the set of policy configurations associated with the selected entity hierarchy. In response to the selection of the entity hierarchy, the system configures the user interface to include information pertaining to the selected entity hierarchy, such as variables associated with the entity hierarchy (or associated with snippets deployed in the context of the entity hierarchy), a list of snippets associated with the entity hierarchy (e.g., a list of snippets being deployed in the context of the entity hierarchy), a list of entities (e.g., devices) within the entity hierarchy, and metadata (e.g., a data source identifier, a data source region, a cloud management identifier, a tenant name, a cloud management region identifier, etc.).

At 1120, a selection of priorities for the policy configurations associated with the selected entity hierarchy is received. In some embodiments, in response to selection of a particular entity hierarchy, the system configures the user interface to include a list of policy configurations (e.g., snippets) associated with the selected entity hierarchy. The user interface may be configured to provide the list of policy configurations in a manner in which the ordering of the associated policy configurations may be modified, or a policy configuration may be selected for editing.

In some embodiments, the order in which the policy configurations are listed corresponds to the respective priorities of the policy configurations. As an example, a policy configurations (e.g., snippet) listed at the top of the list corresponds to a policy configuration having a highest priority. The higher a policy configuration is in the list, the higher the corresponding priority of the policy configuration.

In some embodiments, the ordering of the policy configurations may be modified based at least in part on a selection of a particular policy configuration and a drag and drop of the policy configuration to another location in the list. For example, a policy configuration listed at the bottom of the list (e.g., having a lowest corresponding priority) may be selected and dragged and dropped to the top of the list (e.g., to a point at which the priority for the selected policy configuration is the highest among listed policy configurations).

At 1125, the priorities for the policy configurations associated with the selected entity hierarchy are stored. In some embodiments, in response to the ordering of the policy configurations being updated, the system stores an updated set of priorities for the policy configurations. For example, the ordering of the policy configurations corresponds to the priorities (or relative priorities) of the policy configurations.

At 1130, the system determines whether another entity hierarchy is to be configured. In response to determining that another entity hierarchy is to be configured at 1130, process 1100 returns to 1110 and process 1100 iterates over 1110-1130 until the system determines that no further entity hierarchies are to be configured. In response to determining that no further entity hierarchies are to be configured at 1130, process 1100 proceeds to 1135.

At 1135, a determination is made as to whether process 1100 is complete. In some embodiments, process 1100 is determined to be complete in response to a determination that no further priorities for snippets associated with an entity hierarchy are to be defined, the process has terminated, an administrator indicates that process 1100 is to be paused or stopped, etc. In response to a determination that process 1100 is complete, process 1100 ends. In response to a determination that process 1100 is not complete, process 1100 returns to 1105.

Figure 12:
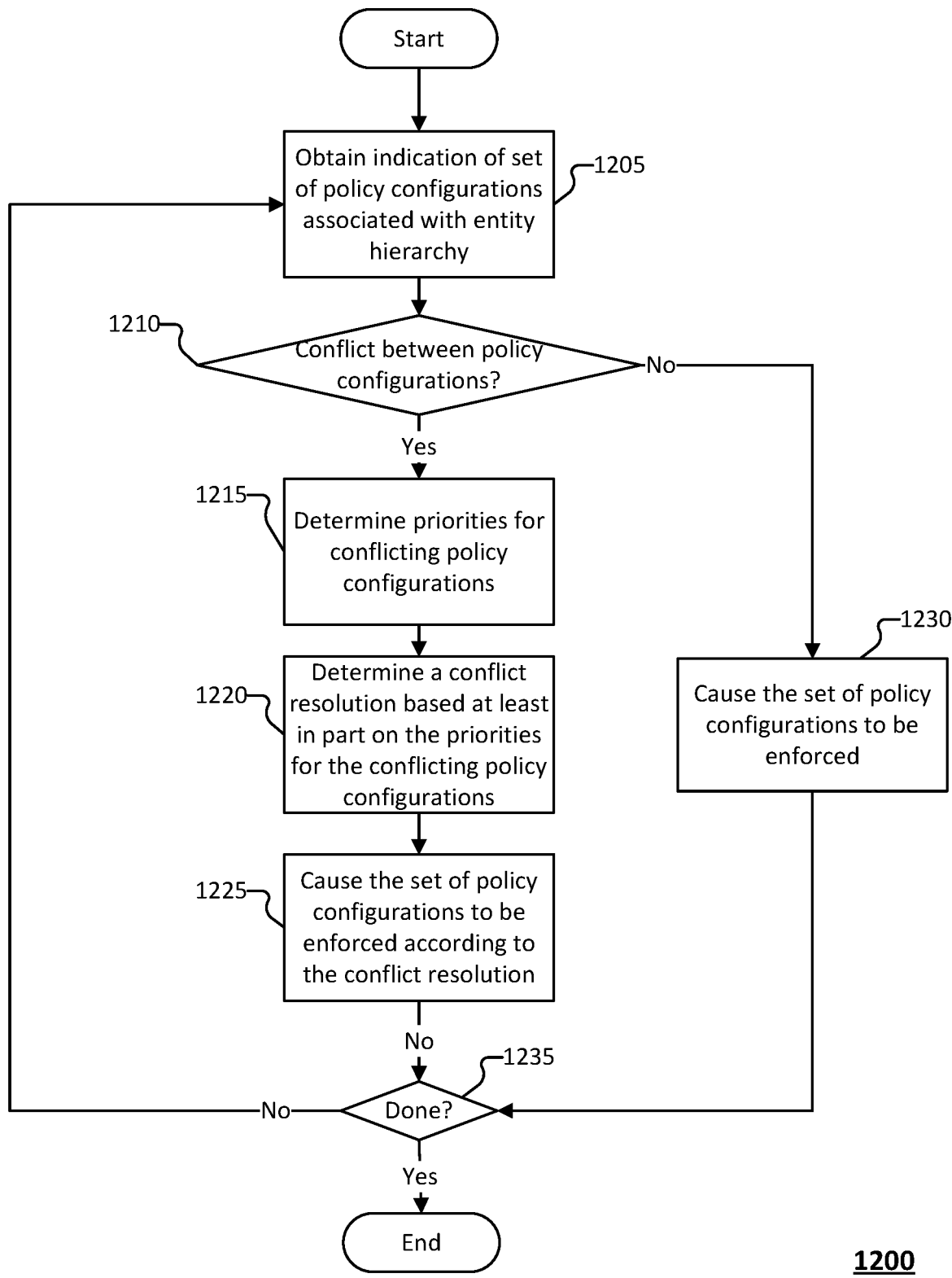
FIG. 12 is a flow diagram of a method for resolving conflicts between snippets associated with an entity hierarchy according to various embodiments.

FIG. 12 is a flow diagram of a method for resolving conflicts between snippets associated with an entity hierarchy according to various embodiments. According to various embodiments, process 1200 is implemented at least in part by system 100 of FIG. 1 and/or system 200 of FIG. 2. In some embodiments, process 1200 is invoked by 810 or 815 of process 800 of FIG. 8. In some embodiments, process 1200 is invoked at one or more entities in the entity hierarchy, such as while the entities are enforcing the associated policy configurations. In some embodiments, process 1200 is invoked at the management platform, which in turn provides instruction to the various entities in the entity hierarchy.

At 1205, an indication of a set of policy configurations associated with an entity hierarchy. The system determines the set of policy configurations that are to be deployed within the context of the entity hierarchy.

At 1210, the system determines whether the set of policy configurations comprises any conflicts in configurations. The system determines, based at least in part on the set of policy configurations associated with the entity hierarchy, whether any configuration or setting defined in at least two of the policy configurations conflicts with one another. In response to determining that at least two policy configurations conflict at 1210, process 1200 proceeds to 1215. Conversely, in response to determining that the set of policy configurations does not comprise any conflicts, process 1200 proceeds to 1230 at which the system causes the set of policy configurations to be enforced.

At 1215, priorities for the conflicting policy configurations are determined. In some embodiments, priorities for the policy configurations are defined in the configuration of the entity hierarchy. For example, the configurations for the entity hierarchies comprises a listing of policy configurations to be deployed in the context for the applicable entity hierarchy. In some embodiments, the system stores a specific priority associated with each policy configuration in the listing of policy configurations. In some embodiments, the ordering of the policy configurations in the listing of policy configurations corresponds to the respective priorities.

At 1220, a conflict resolution is determined based at least in part on the priorities for the conflicting policy configurations. In some embodiments, the system determines that conflicts among conflicting policy configurations is resolved (at least as between the policy configurations defined for the entity hierarchy) in the favor of the higher policy configuration of the conflicting policy configurations. For example, in the event of a conflicting configuration, the system implements the configuration specified in the policy configuration having a highest priority (e.g., at least among the conflicting policy configurations), and does not enforce the configuration(s) of the lower priority policy configuration(s).

In some embodiment, in the event that an entity hierarchy is a sub-hierarchy of a parent entity hierarchy, the system determines conflicts resolution based on favoring configurations specified in policy configurations of the parent entity hierarchy (or other ancestor, such as the parent of the parent entity hierarchy), etc. For example, the system first implements the configurations for the policy configurations for the parent entity hierarchies and then implements, for the entity hierarchy (e.g., the sub-hierarchy) the configurations that do not conflict with a configuration of the parent hierarchies. An example of a parent entity hierarchy and a sub-hierarchy includes an entity hierarchy corresponding to firewalls, a child entity hierarchy corresponding to a grouping of managed firewalls, and a child entity hierarchy (e.g., that depends from the grouping of managed firewalls) corresponding to a grouping of the managed firewalls according to locations or data centers, etc.

At 1225, the system causes the set of policy configurations to be enforced according to the conflict resolution.

At 1235, a determination is made as to whether process 1200 is complete. In some embodiments, process 1200 is determined to be complete in response to a determination that no further priorities for policy configurations are to be deployed, no further conflicts between policy configurations associated an entity hierarchy are to be resolved, the process has terminated, an administrator indicates that process 1200 is to be paused or stopped, etc. In response to a determination that process 1200 is complete, process 1200 ends. In response to a determination that process 1200 is not complete, process 1200 returns to 1205.

Figure 13:
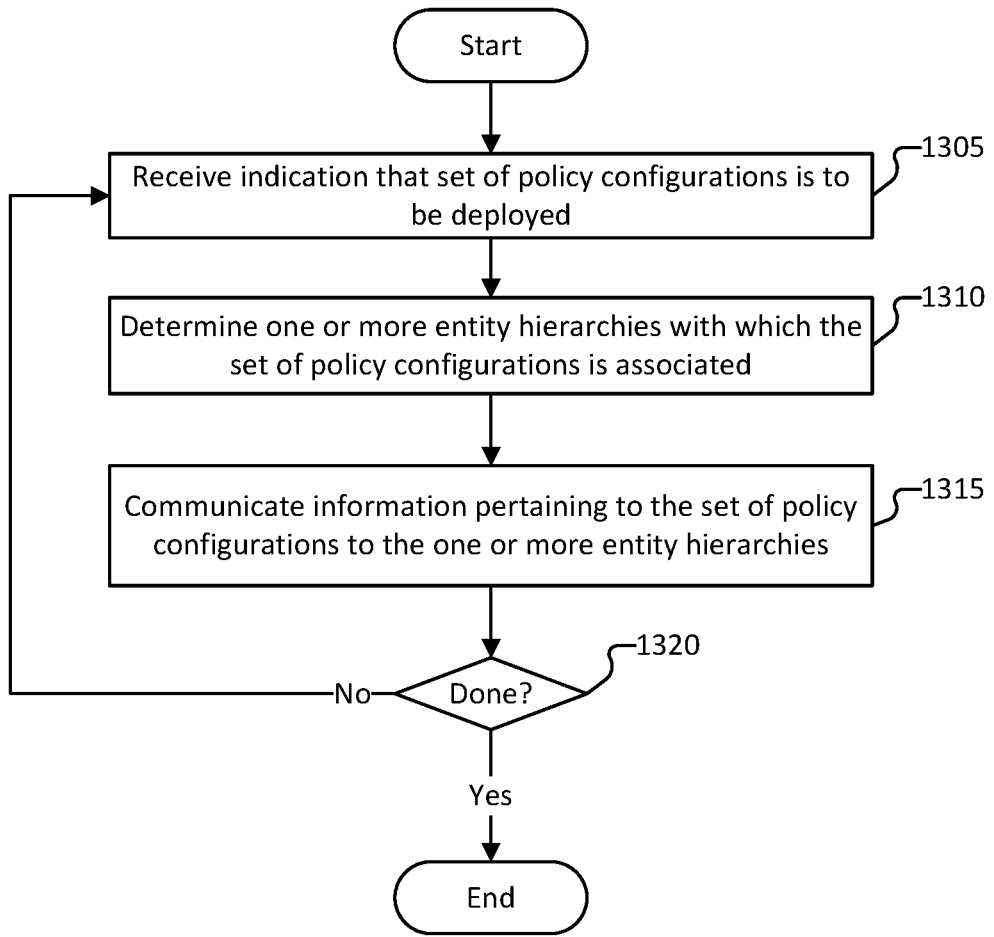
FIG. 13 is a flow diagram for deploying a set of policy configurations according to various embodiments.

FIG. 13 is a flow diagram for deploying a set of policy configurations according to various embodiments. According to various embodiments, process 1300 is implemented at least in part by system 100 of FIG. 1 and/or system 200 of FIG. 2. In some embodiments, process 1300 is invoked by 815 of process 800 of FIG. 8.

At 1305, an indication that set of policy configurations is to be deployed is received. In some embodiments, the indication that the set of policy configurations is to be deployed corresponds the association of the policy configurations with the applicable entity hierarchy. In some embodiments, after the policy configurations have been associated with the entity hierarchy, the system enables a user to selectively deploy the policy configurations. For example, the system lists the set of policy configurations associated with the entity hierarchy or made available in the context of the entity hierarchy, and the system receives selection for a policy configuration to be implemented.

At 1310, one or more entity hierarchies with which the set of policy configurations is to be associated is determined.

At 1315, information pertaining to the set of policy configurations is communicated to the one or more entity hierarchies. For example, in response to receiving the indication that the policy configuration(s) is to be deployed for a particular entity hierarchy, the system determines the entities within the entity hierarchy and communicates (e.g., pushes) the policy configuration to the entities within the entity hierarchy.

At 1320, a determination is made as to whether process 1300 is complete. In some embodiments, process 1300 is determined to be complete in response to a determination that no further policy configurations are to be deployed, the process has terminated, an administrator indicates that process 1300 is to be paused or stopped, etc. In response to a determination that process 1300 is complete, process 1300 ends. In response to a determination that process 1300 is not complete, process 1300 returns to 1305.

Figure 14:
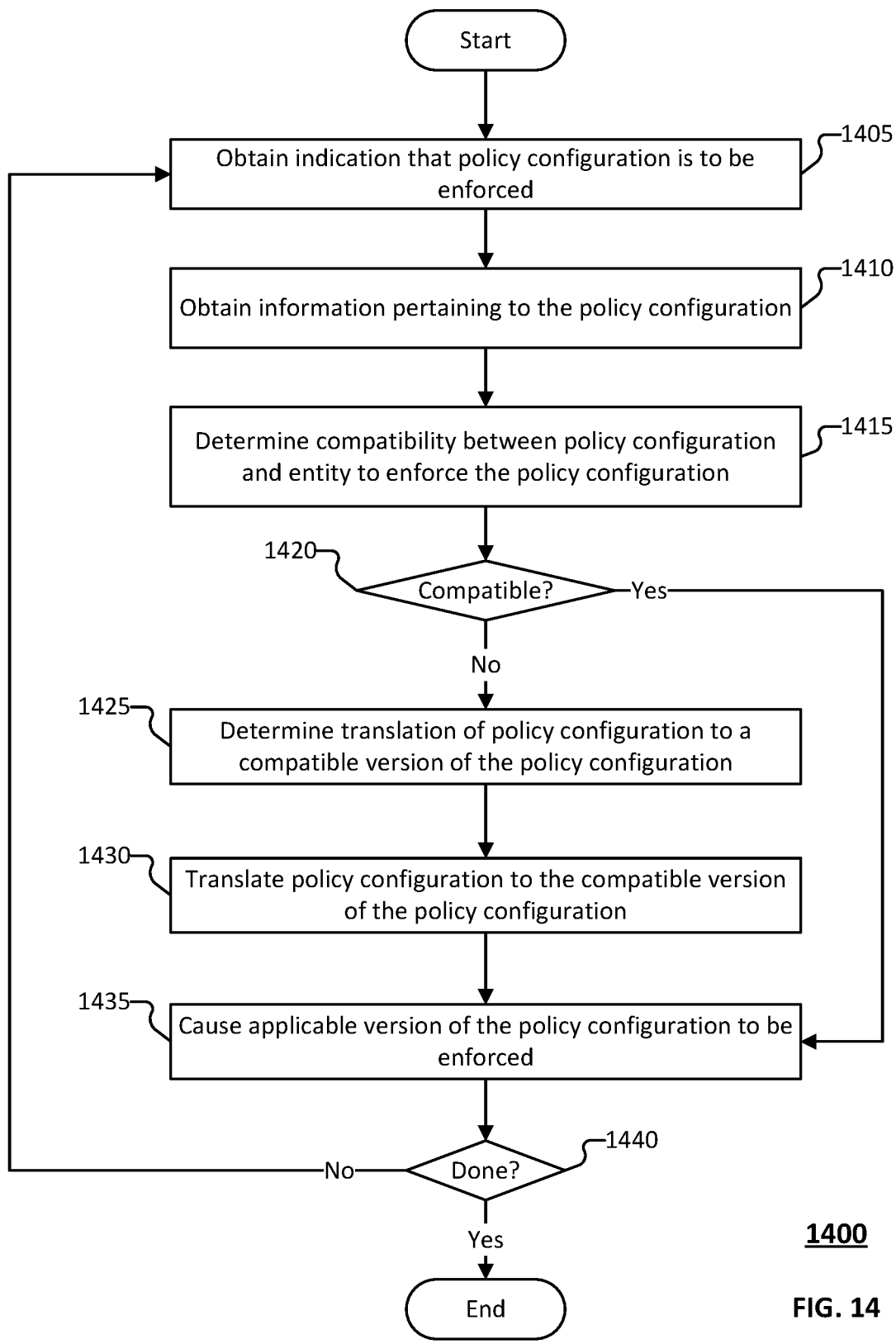
FIG. 14 is a flow diagram of a method for deploying a set of policy configurations according to various embodiments.

FIG. 14 is a flow diagram of a method for deploying a set of policy configurations according to various embodiments. According to various embodiments, process 1400 is implemented at least in part by system 100 of FIG. 1 and/or system 200 of FIG. 2. In some embodiments, process 1400 is invoked by 815 of process 800 of FIG. 8. In some embodiments, process 1400 is performed by the entity at which the corresponding policy configuration is to be deployed/enforced. In some embodiments, process 1400 is implemented by the management platform, such as before pushing the policy configuration to the entity.

At 1405, an indication that a policy configuration is to be enforced is obtained. In some embodiments, the indication that a policy configuration is to be enforced corresponds to, or is generated in response to, the policy configuration being received from the management platform.

At 1410, information pertaining to the policy configuration is obtained. The information pertaining to the policy configuration may include metadata such as versioning information (e.g., the snippet version identifier), an indication of a version of a platform or operating system on which the policy configuration is to be executed, an indication of a compatibility of the policy configuration with various versions of a platform or operating system (e.g., an operating system running on a firewall, etc.).

At 1415, a compatibility between the policy configuration and the entity to enforce the policy configuration is determined. The system determines, based at least in part on the information pertaining to the policy configuration and the information pertaining to the entity, whether the policy configuration is compatible with the entity (e.g., whether the entity can enforce the policy configuration, whether the operating system or platform of the entity can implement/execute the policy configuration, etc.). As an example, the system determines a compatibility of the policy configuration based on a versioning of the policy configuration or other information communicated in association with the policy configuration (e.g., policy configuration metadata), such as indications of versions of platforms or operating systems on which the policy configuration is to be implemented.

At 1420, the system determines whether the policy configuration is compatible with the entity. In response to determining the compatibility of the policy configuration and the entity, the system determines whether the result indicates that the policy configuration is compatible with the entity or indicates that the policy configuration is not compatible with the entity. In response to determining that the policy configuration is not compatible with the entity at 1420, process 1400 proceeds to 1425. Conversely, in response to determining that the policy configuration is compatible with the entity at 1420, process 1400 proceeds to 1435.

At 1425, a translation of the policy configuration to a compatible version of the policy configuration is determined. In some embodiments, the system stores a predefined ruleset for converting (e.g., translating) versions of policy configurations. For example, the system stores a predefined ruleset for converting a policy configuration that is configured to run on a different platform/operating system to the platform/operating system running on the entity.

At 1430, the policy configuration is translated to the compatible version of the policy configuration. In response to determining the translation to be performed to obtain the compatible version of the policy configuration, the system implements the translation.

At 1435, the system causes the applicable version of the policy configuration to be enforced. As an example, in response to obtaining a translated compatible version of the policy configuration, the system causes the entity to enforce such version of the policy configuration. As another example, in response to determining that that the policy configuration provided by the management platform is compatible with the entity (e.g., no translation is required), the system causes such version of the policy configuration to be enforced.

At 1440, a determination is made as to whether process 1400 is complete. In some embodiments, process 1400 is determined to be complete in response to a determination that no further policy configurations are to be deployed, the process has terminated, an administrator indicates that process 1400 is to be paused or stopped, etc. In response to a determination that process 1400 is complete, process 1400 ends. In response to a determination that process 1400 is not complete, process 1400 returns to 1405.

Figure 15:
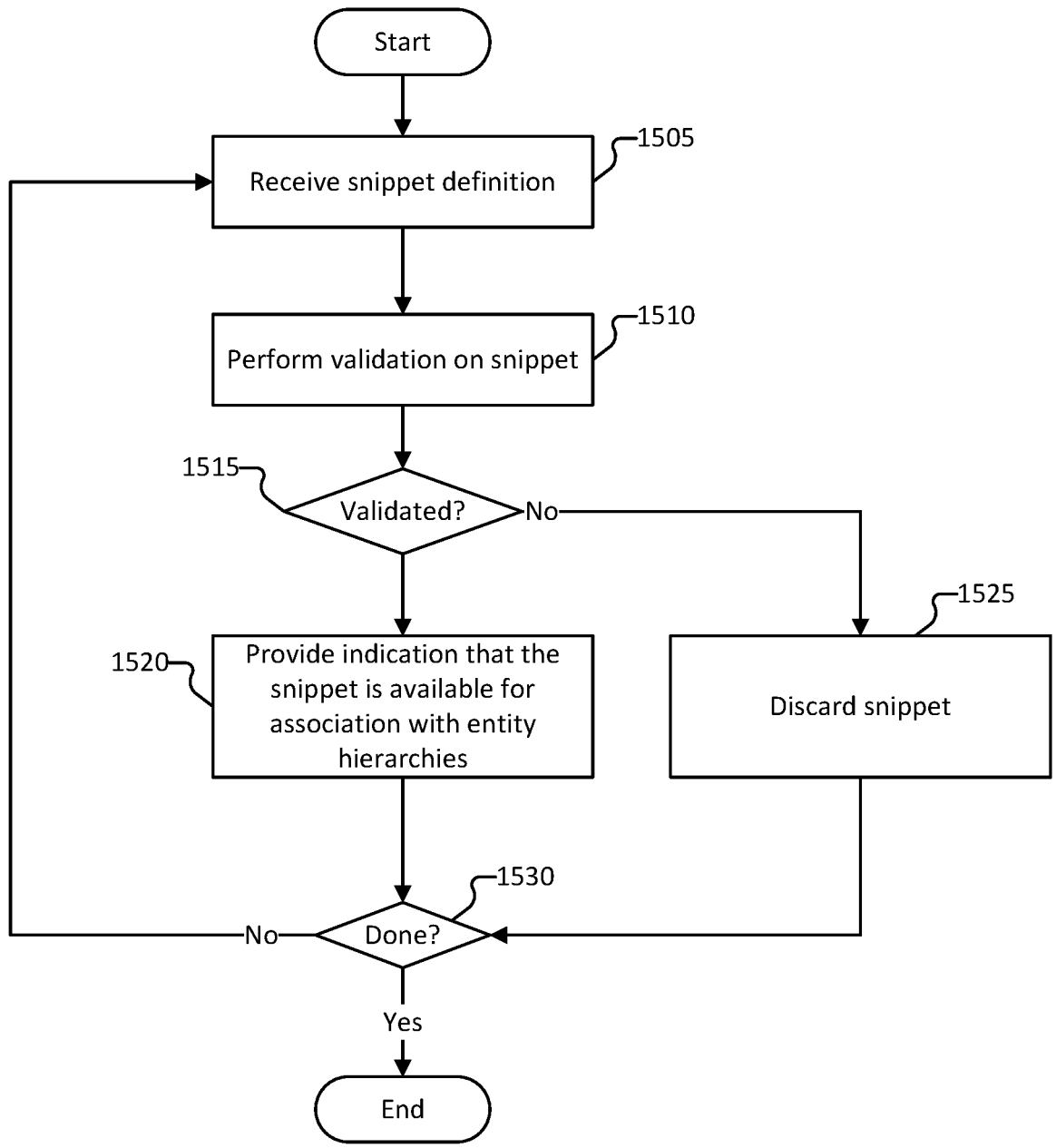
FIG. 15 is a flow diagram of a method for managing snippets according to various embodiments.

FIG. 15 is a flow diagram of a method for managing snippets according to various embodiments. According to various embodiments, process 1500 is implemented at least in part by system 100 of FIG. 1 and/or system 200 of FIG. 2. In some embodiments, process 1500 is invoked by 805 of process 800 of FIG. 8.

At 1505, a snippet definition is received. In some embodiments, the snippet definition is received from a cloud provider of the management platform, a user associated with a customer of the management platform (e.g., an administrator for a tenant, environment, etc. of the customer), or a third-party such as a domain expert or other community-sourcing.

At 1510, the system performs a validation on the snippet. In response to receiving the snippet definition, the system performs a validation on the snippet. The system may determine a type of validation to perform based on the publisher of the snippet, such as based on a determination of whether the publisher is the cloud provider, a user associated with a customer of the management platform, or a third party.

In some embodiments, in response to determining that the snippet is published/provided by a third party, the system parses and analyzes the snippet definition to determine whether the snippet is malicious (e.g., introduces malicious code, exposes a vulnerability, etc.). The validation of a third-party sourced snippet may include determining a ranking or other feedback associated with the snippet. For example, a community of users (e.g., customers, domain experts, etc.) may rank, score, or otherwise provide feedback with respect to available snippets.

At 1515, the system determines whether the snippet is validated. In some embodiments, the determination of whether a third-party source snippet is validated is based at least in part on comparing the scoring/ranking associated with the snippet to a predefined scoring/ranking threshold. For example, the system compares the number or ratio of negative reviews (e.g., ratings less than a predefined rating threshold, flags of maliciousness, etc.) to a predefined review threshold, and determines that the snippet is validated (e.g., to be made available) in response to determining that the number/ratio of negative reviews is less than the predefined review threshold. The system may similarly compare the number/ratio of positive reviews.

In response to determining that the snippet is validated at 1515, process 1500 proceeds to 1520. Conversely, in response to determining that the snippet is not validated at 1515, process 1500 proceeds to 1525. At 1520, an indication that the snippet is available for association with entity hierarchies is provided. At 1525, the snippet is discarded.

At 1530, a determination is made as to whether process 1500 is complete. In some embodiments, process 1500 is determined to be complete in response to a determination that no further policy configurations are obtained, no further policy configurations are to be validated, the process has terminated, an administrator indicates that process 1500 is to be paused or stopped, etc. In response to a determination that process 1500 is complete, process 1500 ends. In response to a determination that process 1500 is not complete, process 1500 returns to 1505.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing policy configurations, comprising:
   one or more processors configured to:
      receive a set of shared policy configurations;
      share the set of shared policy configurations across a plurality of entities, wherein:
         the set of shared policy configurations comprises one or more policy snippets, wherein one or more policy configurations of the set of shared policy configurations comprises a version identifier; and
         in response to a determination to share the set of shared policy configurations, at least one policy snippet has been validated for compatibility with a system version before the set of shared policy configurations are shared; and
      deploy the set of shared policy configurations across the plurality of entities, including causing the plurality of entities to enforce the set of shared policy configurations; and
   a memory coupled to the one or more processors and configured to provide the one or more processors with instructions.

2. The system of claim 1, wherein the at least one policy snippet of the one or more policy snippets comprises an entirety of a configuration schema.

3. The system of claim 1, wherein the set of shared policy configurations comprises a set of security policy configurations.

4. The system of claim 1, wherein sharing the set of policy configurations across the plurality of entities comprises:
   sharing the set of policy configurations across a plurality of tenants.

5. The system of claim 4, wherein the plurality of tenants is associated with different organizations.

6. The system of claim 1, wherein sharing the set of policy configurations across the plurality of entities comprises:
   sharing the set of policy configurations across a plurality of cloud management customers.

7. The system of claim 1, wherein the plurality of entities comprises one or more of a tenant, a customer, a managed device, and endpoint.

8. The system of claim 1, wherein:
   the one or more processors are further configured to:
      generate a policy configuration; and
      share the policy configuration with a set of cloud management customers.

9. The system of claim 1, wherein the one or more processors are further configured to:
   associate a first policy configuration with a folder comprising one or more other policy configurations.

10. The system of claim 9, wherein the first policy configuration is associated with the folder based on a user input to a user interface.

11. The system of claim 1, wherein the one or more processors are further configured to:
    resolve a conflict between a plurality of shared policy configurations within the set of shared policy configurations based at least in part on an entity hierarchy.

12. The system of claim 11, wherein the conflict is resolved based on a determination of an ordering associated with the plurality of shared policy configurations.

13. The system of claim 1, wherein the one or more processors are further configured to:
    determine that a policy configuration within the set of shared policy configurations is updated; and
    in response to determining that the policy configuration is updated, automatically deploy an updated policy configuration.

14. The system of claim 1, wherein deploying the set of shared policy configurations includes sharing a package of policy configurations for customers to use for policy enforcement.

15. The system of claim 14, wherein the package of policy configurations comprises a set of third-party policy configurations that are re-packaged for customers to selectively deploy.

16. The system of claim 14, wherein the package of policy configurations comprises a plurality of predetermined security policy configurations to be selectively deployed by a plurality of cloud management customers.

17. The system of claim 1, wherein one or more policy configurations of the set of shared policy configurations comprises a version identifier.

18. The system of claim 1, wherein:
    in response to deployment of the set of shared policy configurations to a first entity comprised in the plurality of entities, the first entity determines whether a first policy configuration is compatible with a system version running on the first entity; and in response to a determination that the first policy is not compatible with the system version, the first policy is transformed to a version of the first policy that is compatible with the system version.

19. The system of claim 1, wherein:
deploying the set of shared policy configurations includes pushing the set of shared policy configurations to a plurality of firewalls based at least in part on an input to a management platform; and
the input corresponds to an association of one or more shared policy configurations with the plurality of firewalls.

20. The system of claim 1, wherein:
the one or more processors are further configured to configure a user interface of a policy management platform; and
the user interface comprises an indication of policy configurations associated with an entity hierarchy of the plurality of entities.

21. The system of claim 20, wherein the user interface delineates, for the entity hierarchy of the plurality of entities, a set of locally defined configurations and shared policy configurations that are deployed by a management platform.

22. The system of claim 1, wherein:
the plurality of entities are comprised in a predefined group of entities;
the set of shared policy configurations are associated with the predefined group of entities; and
in response to determining that a particular entity is newly added to the defined group, the set of shared policy configurations are pushed to the particular entity.

23. The system of claim 1, wherein the one or more processors are further configured to resolve a conflict between a plurality of shared policy configurations within the set of shared policy configurations based at least in part on an entity hierarchy associated with the plurality of entities.

24. The system of claim 23, wherein the conflict is resolved based at least in part on a determination of an ordering associated with the plurality of shared policy configurations, wherein the ordering is based on a hierarchy of the plurality of entities.

25. The system of claim 1, wherein deploying the set of shared policy configurations comprises:
at a first entity of the plurality of entities, determining whether a first policy configuration is compatible with a version of a system executing on the first entity; and
in response to determining that the first policy configuration is not compatible, transforming the first policy configuration into a version that is compatible with the system executing on the first entity.

26. A method for managing policy configurations, comprising:
receiving, by one or more processors, a set of shared policy configurations;
sharing the set of shared policy configurations across a plurality of entities, wherein:
the set of shared policy configurations comprises one or more policy snippets, wherein one or more policy configurations of the set of shared policy configurations comprises a version identifier; and
in response to a determination to share the set of shared policy configurations, at least one policy snippet has been validated for compatibility with a system version before the set of shared policy configurations are shared; and
deploying the set of shared policy configurations across the plurality of entities, including causing the plurality of entities to enforce the set of shared policy configurations.

27. A computer program product embodied in a non-transitory computer readable medium for managing policy configurations, and the computer program product comprising computer instructions for:
receiving, by one or more processors, a set of shared policy configurations;
sharing the set of shared policy configurations across a plurality of entities, wherein:
the set of shared policy configurations comprises one or more policy snippets, wherein one or more policy configurations of the set of shared policy configurations comprises a version identifier; and
in response to a determination to share the set of shared policy configurations, at least one policy snippet has been validated for compatibility with a system version before the set of shared policy configurations are shared; and
deploying the set of shared policy configurations across the plurality of entities, including causing the plurality of entities to enforce the set of shared policy configurations.

* * * * *